US012719612B2

(12) United States Patent
Wu et al.

(10) Patent No.: US 12,719,612 B2
(45) Date of Patent: Aug. 25, 2026

(54) MACHINE LEARNING ASSISTED PREDICTIVE RETRANSMISSION FEEDBACK

(71) Applicant: QUALCOMM Incorporated, San Diego, CA (US)

(72) Inventors: Liangming Wu, Beijing (CN); Hao Xu, Beijing (CN); Qiaoyu Li, Beijing (CN); Chenxi Hao, Beijing (CN); Rui Hu, Beijing (CN); Yu Zhang, San Diego, CA (US); Yuwei Ren, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 18/257,566

(22) PCT Filed: Feb. 11, 2021

(86) PCT No.: PCT/CN2021/076628
§ 371 (c)(1),
(2) Date: Jun. 14, 2023

(87) PCT Pub. No.: WO2022/170620
PCT Pub. Date: Aug. 18, 2022

(65) Prior Publication Data

US 2024/0039659 A1 Feb. 1, 2024

(51) Int. Cl.
*H04L 1/18* (2023.01)
*H04L 41/16* (2022.01)
(Continued)

(52) U.S. Cl.
CPC ................ *H04L 1/18* (2013.01); *H04L 41/16* (2013.01); *H04W 8/24* (2013.01); *H04W 72/20* (2023.01)

(58) Field of Classification Search
CPC ....... H04L 1/18; H04L 1/1854; H04L 1/1887; H04L 5/14; H04W 8/24; H04W 72/20; H04W 72/21; H04W 72/23
(Continued)

(56) References Cited

U.S. PATENT DOCUMENTS

2013/0223364 A1 8/2013 Akkarakaran et al.
2015/0009897 A1* 1/2015 Wilhelmsson ........ H04L 1/1887 370/328
(Continued)

FOREIGN PATENT DOCUMENTS

EP 2945438 A1 11/2015
WO WO-2016076301 A1 5/2016
WO WO-2020030115 A1 * 2/2020 ........... H04L 1/1887

OTHER PUBLICATIONS

Fraunhofer HHI., et al., "Scheduling/HARQ Processing Timeline Enhancements for NR URLLC", 3GPP Draft, 3GPP TSG RAN WG1 Meeting AH-1901, R1-1901152, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2018-Jan. 25, 2018, Jan. 20, 2019 (Jan. 20, 2019), XP051593996, 6 Pages, p. 3-p. 4, Figure 2, Section 3.2.
(Continued)

*Primary Examiner* — Harun Chowdhury
(74) *Attorney, Agent, or Firm* — Holland & Hart LLP/ QUALCOMM Incorporated

(57) ABSTRACT

Methods, systems, and devices for wireless communications are described. The method includes transmitting, to a base station, a capability parameter indicating one or more predictive retransmission feedback capabilities of the UE, receiving, from the base station, an activation indicator that indicates a predictive retransmission feedback procedure is enabled, receiving data from the base station, and transmitting a predictive retransmission feedback associated with the
(Continued)

115-d
105-d
605 Capability Parameter
610 Activation Indicator
615 Data Transmission
620 Compute predictive retransmission feedback
625 Predictive Retransmission Feedback
630 Resource Modification Request
635 Second Predictive Retransmission Feedback
600 data to the base station, the predictive retransmission feedback being computed, in accordance with the activation indicator, prior to completing a decoding of the data.

29 Claims, 18 Drawing Sheets

(51) Int. Cl.
*H04W 8/24* (2009.01)
*H04W 72/20* (2023.01)

(58) Field of Classification Search
USPC ................................ 370/216, 252, 328, 329
See application file for complete search history.

(56) References Cited

U.S. PATENT DOCUMENTS

2016/0329995 A1* 11/2016 Jiang ......................... H04L 5/14
2018/0026755 A1 1/2018 Meng
2018/0041311 A1 2/2018 Werner et al.
2020/0137752 A1* 4/2020 Parkvall ................ H04W 72/21
2020/0266932 A1 8/2020 Yang et al.

OTHER PUBLICATIONS

International Search Report and Written Opinion—PCT/CN2021/076628—ISA/EPO—Jul. 19, 2021.
European Search Report—EP25222828—Search Authority—The Hague—Feb. 20, 2026.
3GPP: "3rd Generation Partnership Project, Technical Specification Group Services and System Aspects, Service Requirements for the 5G System, Stage 1 (Release 15)", Technical Specification, 3GPP TS 22.261 V15.3.0, 3GPP Organizational Partners, Sophia Antipolis Valbonne, France, Dec. 2017, pp. 1-52.
Strodthoff N., et al., "Enhanced Machine Learning Techniques for Early HARQ Feedback Prediction in 5G", IEEE Journal on Selected Areas in Communications, vol. 37, No. 11, Nov. 2019, pp. 2573-2587.

* cited by examiner

300

500

700

1100

MACHINE LEARNING ASSISTED PREDICTIVE RETRANSMISSION FEEDBACK

CROSS REFERENCE

The present application is a 371 national stage filing of International PCT Application No. PCT/CN2021/076628 by WU et al. entitled "MACHINE LEARNING ASSISTED PREDICTIVE RETRANSMISSION FEEDBACK," filed Feb. 11, 2021, which is assigned to the assignee hereof, and which is expressly incorporated by reference in its entirety herein.

INTRODUCTION

The following relates to wireless communications, and more specifically, retransmission feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a user equipment (UE) is described. The method may include transmitting, to a base station, a capability parameter indicating one or more predictive retransmission feedback capabilities of the UE, receiving, from the base station, an activation indicator that indicates a predictive retransmission feedback procedure is enabled, receiving data from the base station, and transmitting a predictive retransmission feedback associated with the data to the base station, the predictive retransmission feedback being computed, in accordance with the activation indicator, prior to completing a decoding of the data.

An apparatus for wireless communication at a UE is described. The apparatus may include a processor and memory coupled to the processor. The processor and memory may be configured to transmit, to a base station, a capability parameter indicating one or more predictive retransmission feedback capabilities of the UE, receive, from the base station, an activation indicator that indicates a predictive retransmission feedback procedure is enabled, receive data from the base station, and transmit a predictive retransmission feedback associated with the data to the base station, the predictive retransmission feedback being computed, in accordance with the activation indicator, prior to completing a decoding of the data.

Another apparatus for wireless communication at a UE is described. The apparatus may include means for transmitting, to a base station, a capability parameter indicating one or more predictive retransmission feedback capabilities of the UE, means for receiving, from the base station, an activation indicator that indicates a predictive retransmission feedback procedure is enabled, means for receiving data from the base station, and means for transmitting a predictive retransmission feedback associated with the data to the base station, the predictive retransmission feedback being computed, in accordance with the activation indicator, prior to completing a decoding of the data.

A non-transitory computer-readable medium storing code for wireless communication at a UE is described. The code may include instructions executable by a processor to transmit, to a base station, a capability parameter indicating one or more predictive retransmission feedback capabilities of the UE, receive, from the base station, an activation indicator that indicates a predictive retransmission feedback procedure is enabled, receive data from the base station, and transmit a predictive retransmission feedback associated with the data to the base station, the predictive retransmission feedback being computed, in accordance with the activation indicator, prior to completing a decoding of the data.

Some examples of the method, apparatuses, and non-transitory computer-readable medium described herein may further include operations, features, means, or instructions for transmitting the capability parameter to the base station via radio resource control signaling, or uplink control information, or media access control control element (MAC-CE), or any combination thereof.

Some examples of the method, apparatuses, and non-transitory computer-readable medium described herein may further include operations, features, means, or instructions for receiving the activation indicator from the base station via downlink control information, or media access control control element (MAC-CE), or radio resource control signaling, or any combination thereof.

Some examples of the method, apparatuses, and non-transitory computer-readable medium described herein may further include operations, features, means, or instructions for transmitting a first predictive retransmission feedback on a first physical uplink resource indicated via the activation indicator and transmitting a second predictive retransmission feedback on a second physical uplink resource indicated via the activation indicator.

Some examples of the method, apparatuses, and non-transitory computer-readable medium described herein may further include operations, features, means, or instructions for transmitting, to the base station, a request to increase or decrease an aspect of a physical downlink resource indicated via the activation indicator in response to computing the predictive retransmission feedback.

In some examples of the method, apparatuses, and non-transitory computer-readable medium described herein, the request includes a modification indicator selected from a set of modification index values, and where when the predictive retransmission feedback indicates a non-acknowledgement feedback the modification indicator may be configured with a first index value to indicate a degree of increase with respect to the aspect of the physical downlink resource, and when the predictive retransmission feedback includes an acknowledgement feedback the modification indicator may be configured with a second index value to indicate a degree of decrease with respect to the aspect of the physical downlink resource.

Some examples of the method, apparatuses, and non-transitory computer-readable medium described herein may further include operations, features, means, or instructions for selecting at least one index of a capability table, each index of the capability table including one or more configured capability parameters and transmitting the selected at least one index to the base station.

Some examples of the method, apparatuses, and non-transitory computer-readable medium described herein may further include operations, features, means, or instructions for determining that the activation indicator indicates a physical uplink resource for a single predictive retransmission feedback per data transmission or indicates physical uplink resources for multiple predictive retransmission feedbacks per data transmission.

Some examples of the method, apparatuses, and non-transitory computer-readable medium described herein may further include operations, features, means, or instructions for determining that the activation indicator indicates a slot offset for each physical uplink resource scheduled for the predictive retransmission feedback procedure associated with the data.

Some examples of the method, apparatuses, and non-transitory computer-readable medium described herein may further include operations, features, means, or instructions for determining that the activation indicator indicates a configuration of the predictive retransmission feedback procedure or a periodic physical uplink resource pre-configured for the predictive retransmission feedback procedure, or determining that the activation indicator indicates both.

A method for wireless communication at a base station is described. The method may include receiving, from a UE, a capability parameter indicating one or more predictive retransmission feedback capabilities of the UE, configuring an activation indicator in accordance with the received capability parameter, transmitting, to the UE, the activation indicator indicating that a predictive retransmission feedback procedure is enabled, transmitting data to the UE, and receiving a predictive retransmission feedback associated with the data from the UE prior to a decoding of the data being completed.

An apparatus for wireless communication at a base station is described. The apparatus may include a processor and memory coupled to the processor. The processor and memory may be configured to receive, from a UE, a capability parameter indicating one or more predictive retransmission feedback capabilities of the UE, configure an activation indicator in accordance with the received capability parameter, transmit, to the UE, the activation indicator indicating that a predictive retransmission feedback procedure is enabled, transmit data to the UE, and receive a predictive retransmission feedback associated with the data from the UE prior to a decoding of the data being completed.

Another apparatus for wireless communication at a base station is described. The apparatus may include means for receiving, from a UE, a capability parameter indicating one or more predictive retransmission feedback capabilities of the UE, means for configuring an activation indicator in accordance with the received capability parameter, means for transmitting, to the UE, the activation indicator indicating that a predictive retransmission feedback procedure is enabled, means for transmitting data to the UE, and means for receiving a predictive retransmission feedback associated with the data from the UE prior to a decoding of the data being completed.

A non-transitory computer-readable medium storing code for wireless communication at a base station is described. The code may include instructions executable by a processor to receive, from a UE, a capability parameter indicating one or more predictive retransmission feedback capabilities of the UE, configure an activation indicator in accordance with the received capability parameter, transmit, to the UE, the activation indicator indicating that a predictive retransmission feedback procedure is enabled, transmit data to the UE, and receive a predictive retransmission feedback associated with the data from the UE prior to a decoding of the data being completed.

Some examples of the method, apparatuses, and non-transitory computer-readable medium described herein may further include operations, features, means, or instructions for receiving the capability parameter from the UE via radio resource control signaling, or uplink control information, or media access control control element (MAC-CE), or any combination thereof.

Some examples of the method, apparatuses, and non-transitory computer-readable medium described herein may further include operations, features, means, or instructions for transmitting the activation indicator to the UE via downlink control information, or media access control control element (MAC-CE), or radio resource control signaling, or any combination thereof.

Some examples of the method, apparatuses, and non-transitory computer-readable medium described herein may further include operations, features, means, or instructions for receiving, from the UE, a first predictive retransmission feedback on a first physical uplink resource indicated via the activation indicator and receiving, from the UE, a second predictive retransmission feedback on a second physical uplink resource indicated via the activation indicator.

Some examples of the method, apparatuses, and non-transitory computer-readable medium described herein may further include operations, features, means, or instructions for determining that the predictive retransmission feedback includes a non-acknowledgement feedback for the data and receiving, from the UE, a modification indicator configured with a first index value selected from a set of modification index values, the first index value indicating a request to increase an aspect of a physical uplink resource indicated via the activation indicator in accordance with the determined non-acknowledgement feedback.

Some examples of the method, apparatuses, and non-transitory computer-readable medium described herein may further include operations, features, means, or instructions for determining that the predictive retransmission feedback includes an acknowledgement feedback for the data and receiving, from the UE, a modification indicator configured with a first index value selected from a set of modification index values, the first index value indicating a request to decrease an aspect of a physical uplink resource indicated via the activation indicator in accordance with the determined acknowledgement feedback.

Some examples of the method, apparatuses, and non-transitory computer-readable medium described herein may further include operations, features, means, or instructions for receiving, from the UE, at least one index of a capability table, each index of the capability table including one or more configured capability parameters.

Some examples of the method, apparatuses, and non-transitory computer-readable medium described herein may further include operations, features, means, or instructions for determining that the capability parameter includes a maximum supported transport block size, or a maximum supported code rate, or a minimum time window in which to transmit one or more predictive retransmission feedbacks per data transmission, a false alarm probability constraint, or a missed detection probability constraint, or support for the predictive retransmission feedback procedure, or support for multiple predictive retransmission feedbacks per data transmission, or any combination thereof.

Some examples of the method, apparatuses, and non-transitory computer-readable medium described herein may further include operations, features, means, or instructions for configuring the activation indicator to indicate a physical uplink resource for a single predictive retransmission feedback per data transmission or physical uplink resources for multiple predictive retransmission feedbacks per data transmission.

Some examples of the method, apparatuses, and non-transitory computer-readable medium described herein may further include operations, features, means, or instructions for configuring the activation indicator to indicate a slot offset for each physical uplink resource scheduled for the predictive retransmission feedback procedure.

Some examples of the method, apparatuses, and non-transitory computer-readable medium described herein may further include operations, features, means, or instructions for determining a configuration of the predictive retransmission feedback procedure in accordance with the capability parameter and configuring the activation indicator to indicate the configuration of the predictive retransmission feedback procedure or a periodic physical uplink resource preconfigured for the predictive retransmission feedback procedure, or configuring the activation indicator to indicate both.

DETAILED DESCRIPTION

Figure 1:
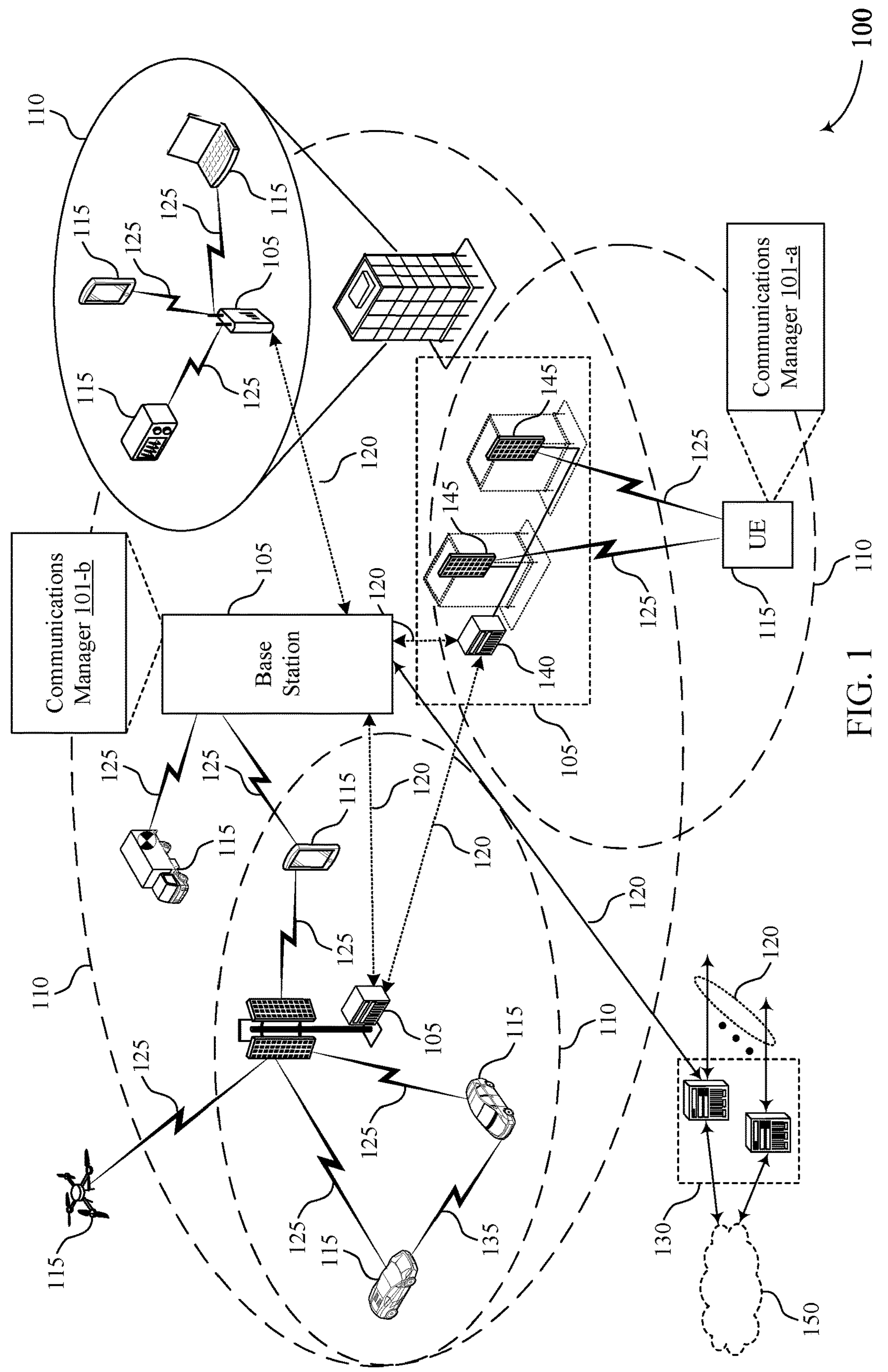
FIG. 1 illustrates an example of a wireless communications system that supports machine learning assisted predictive retransmission feedback in accordance with aspects of the present disclosure.

The described techniques relate to improved methods, systems, devices, and apparatuses that support machine learning assisted predictive retransmission feedback.

When a UE receives a downlink packet, a channel decoder of the UE may determine whether the received packet is decodable. After the channel decoder correctly decodes the received packet the UE may transmit an acknowledgment (ACK) feedback to a base station. Otherwise, the UE may transmit a non-acknowledgment (NACK) feedback to the base station. Accordingly, some existing systems determine whether to send hybrid automatic repeat request (HARQ) feedback (e.g., ACK or NACK) after the channel decoder has determined whether the received packet is decodable. However, some systems such as ultra-reliable low-latency communication (URLLC) services, traffic control networks, remote surgery networks, etc., include stringent constraints for relatively low latency (e.g., 1 ms) and relatively high reliability (e.g., 99.999%). In some cases, HARQ feedback procedures may pose a bottleneck for achieving or maintaining these stringent latency and reliability constraints.

The present techniques facilitate minimizing the latency associated with HARQ feedback procedures (e.g., a UE transmitting ACK/NACK feedback to a base station) by facilitating a machine learning assisted predictive retransmission feedback. In some cases, predictive retransmission feedback may include the UE predicting the HARQ feedback before an entire data packet or data transmission is received by the UE. In some cases, predictive retransmission feedback may include the UE predicting the HARQ feedback based on the UE using machine learning (e.g., artificial intelligence, deep learning, etc.) to compute a probability of whether a decoding process for a partially decoded packet (e.g., partially decoded packet before the entire packet is received by the UE) is more likely to result in an ACK feedback or a NACK feedback.

To accommodate a predicted HARQ feedback process, the present techniques may include the UE transmitting a capability parameter to the base station. In one example, the UE may transmit its capability parameter via radio resource control (RRC) signaling. Examples of the capabilities indicated by the capability parameter may include a maximum supported Transport Block Size (TBS), a maximum supported code rate, a minimum time constraint associated with predicting feedback ACK/NACK, a false alarm probability constraint (e.g., a maximum error rate at which an actual ACK may be falsely predicted as a NACK), a missed detection probability constraint (e.g., a maximum error rate at which an actual NACK may be falsely predicted as an ACK), multiple ACK/NACK prediction support, etc. Based on the capability parameter that the base station receives from the UE, the base station may schedule a data transmission, reserve resources (e.g., physical uplink control channel (PUCCH) resources, physical uplink shared channel (PUSCH) resources) for the predicted HARQ feedback, and indicate the reserved resources to the UE. The base station may then transmit the data transmission to the UE. Before the UE receives the complete data transmission, the UE may predict the HARQ feedback. The UE may then transmit the predicted HARQ feedback to the base station. In some cases, the UE may transmit the predicted HARQ feedback to the base station before the UE receives the complete data transmission.

In some examples, the UE may transmit a request to the base station to increase or decrease an aspect of a physical downlink resource (e.g., physical downlink control channel, physical downlink shared channel) in response to computing the predictive retransmission feedback. In some cases, the aspect of the physical downlink resource may include resources allocated to a physical downlink control channel (e.g., a frequency resource allocation, or a time resource allocation, or a power level allocation, or any combination thereof).

Aspects of the subject matter described herein may support improvements in system efficiency such that a device may implement a machine learning assisted predictive retransmission feedback to decrease a latency associated with HARQ feedback procedures. Described techniques may result in the system avoiding multiple retransmissions and failed transmissions, decreasing system latency, improving the reliability of a decoding procedure for uplink transmissions at a base station, and improving user experience.

Aspects of the disclosure are initially described in the context of wireless communications systems. Aspects of the disclosure are further illustrated by and described with reference to wireless communication systems, timing structures, block diagrams, and process flows that relate to machine learning assisted predictive retransmission feedback. Aspects of the disclosure are further illustrated by and described with reference to apparatus diagrams, system diagrams, and flowcharts that relate to machine learning assisted predictive retransmission feedback.

FIG. 1 illustrates an example of a wireless communications system 100 that supports machine learning assisted predictive retransmission feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In various examples, a communications manager 101 may be included in a device to support beam correlation evaluation for carrier aggregation, which may or may not be associated with specific configurations or operations for uplink carrier aggregation or downlink carrier aggregation. For example, a UE 115 may include a communications manager 101-*a*, or a base station may include a communications manager 101-*b*.

In some examples, a communications manager 101 may transmit, to a base station (e.g., a base station 105 of FIG. 1), a capability parameter indicating one or more predictive retransmission feedback capabilities of a UE (e.g., a UE 115 of FIG. 1). In some cases, the communications manager 101 may receive, from the base station, an activation indicator that indicates a predictive retransmission feedback procedure is enabled. In some cases, the communications manager 101 may receive data from the base station and transmit a predictive retransmission feedback associated with the data to the base station. In some cases, the communications manager 101 may compute the predictive retransmission feedback prior to completing a decoding of the data and in accordance with the activation indicator.

Figure 2A:
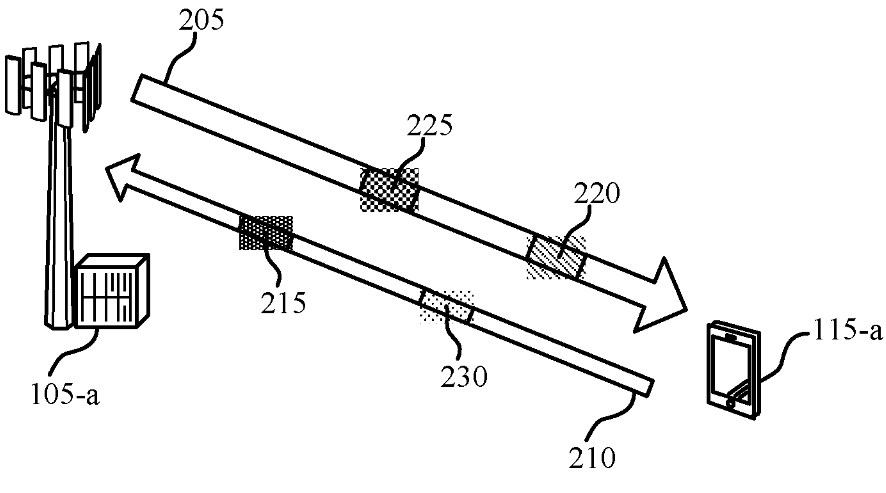
FIGS. 2A and 2B illustrate examples of a wireless communications system that supports machine learning assisted predictive retransmission feedback in accordance with aspects of the present disclosure.

FIG. 2A illustrates an example of a wireless communications system 200 that supports machine learning assisted predictive retransmission feedback in accordance with aspects of the present disclosure.

As illustrated, wireless communications system 200 may include UE 115-*a* and base station 105-*a*, which may be examples of a UE 115 or a base station 105, as described herein with reference to FIG. 1. Wireless communications system 200 may also include downlink 205 and uplink 210. In some cases, downlink 205 may include one or more physical downlink channels and uplink 210 may include one or more physical uplink channels. Accordingly, base station 105-*a* may use downlink 205 to convey control and/or data information to UE 115-*a*. And UE 115-*a* may use uplink 210 to convey control and/or data information to base station 105-*a*. In some cases, downlink 205 may use different time and/or frequency resources than uplink 210.

In some examples, UE 115-*a* may transmit a capability parameter 215 to base station 105-*a*. The capability parameter 215 may indicate one or more predictive retransmission feedback capabilities of the UE 115-*a*. The base station 105-*a* may determine the predictive retransmission feedback capabilities of the UE 115-*a* based on the received capability parameter 215. Based on the base station 105-*a* determining the predictive retransmission feedback capabilities of the UE 115-*a*, the base station 105-*a* may transmit to the UE 115-*a* an activation indicator 220 that indicates to the UE 115-*a* that a predictive retransmission feedback procedure is enabled. The UE 115-*a* may determine that the predictive retransmission feedback procedure is enabled based on the received activation indicator 220. In some cases, the UE 115-*a* may determine one or more aspects of predictive retransmission feedback procedure (e.g., configuration aspects of the predictive retransmission feedback procedure) based on information in the activation indicator 220 or information received in conjunction with the activation indicator 220. In some cases, the UE 115-*a* may receive a portion of the data of data transmission 225 from the base station 105-*a*. In some cases, the UE 115-*a* may transmit a predictive retransmission feedback 230 associated with data transmission 225 to the base station 105-*a*. In some cases, the UE 115-*a* may compute the predictive retransmission feedback 230 prior to the UE 115-*a* completing a decoding of the data of data transmission 225 (e.g., prior to UE 115-*a* receiving all of the data of data transmission 225). In some cases, the UE 115-*a* may compute the predictive retransmission feedback 230 in accordance with the activation indicator 220.

In some examples, the activation indicator 220 may indicate a physical uplink resource associated with the predictive retransmission feedback procedure. In some cases, UE 115-*a* may determine that the activation indicator 220 indicates a periodic physical uplink resource pre-configured for the predictive retransmission feedback procedure. In some cases, the pre-configured periodic physical uplink resource may be configured by base station 105-*a* before UE 115-*a* transmits the capability parameter 215 to base station 105-*a*.

In some examples, UE 115-*a* may transmit a request to base station 105-*a* that corresponds to the predictive retransmission feedback 230. In some cases, the transmitted request may include a request to decrease an aspect of the physical uplink resource in response to UE 115-*a* predicting an ACK feedback. In some cases, the transmitted request may include a request to increase an aspect of the physical uplink resource in response to UE 115-*a* predicting a NACK feedback. In some cases, the aspect of the physical uplink resource may include a time period of the physical uplink resource, or a frequency bandwidth of the physical uplink resource, or a transmission power of the physical uplink resource, or any combination thereof.

In some cases, the request may include a modification indicator. In some cases, the modification indicator may be signaled in radio resource control signaling, or uplink control information, or a media access control control element (MAC-CE), or any combination thereof. In some cases, the modification indicator may include a value that indicates a degree of increase or decrease with respect to the aspect of the physical downlink resource.

In some cases, when the predictive retransmission feedback 230 includes a non-acknowledgement feedback, the modification indicator may include a value that indicates a degree of increase with respect to the aspect of the physical downlink resource, and when the predictive retransmission feedback 230 includes an acknowledgement feedback, the modification indicator may include a value that indicates a degree of decrease with respect to the aspect of the physical downlink resource. In some cases, the modification indicator may indicate a proportional value that indicates a proportional increase or proportional decrease in the aspect of the physical downlink resource.

In some cases, the modification indicator may include a delta value that indicates a delta increase or a delta decrease in the aspect of the physical downlink resource. In some cases, the modification indicator may include a resource delta that indicates a delta increase or a delta decrease in resources allocated for the physical downlink resource. As an example, a physical downlink control channel of a scheduled transmission may be allocated 52 resource blocks (RBs). As the UE 115-*a* receives the scheduled transmission, and before the UE 115-*a* receives the complete scheduled transmission, the UE 115-*a* may predict a NACK feedback for the partially-received scheduled transmission. As an example, the UE 115-*a* may determine that 13 additional RBs would be sufficient to enable the UE 115-*a* to receive the scheduled transmission with an ACK feedback. Since 13 RBs are a quarter of the already allocated 52 RBs, the UE 115-*a* may configure the modification indicator to indicate a one-fourth increase (e.g., $\alpha=1/4$) in RBs for the schedule transmission. In some cases, the modification indicator may include a positive value to indicate an increase in the aspect of the physical downlink resource, or a negative value to indicate a decrease in the aspect of the physical downlink resource. In some cases, the modification indicator may include a binary value (e.g., a sequence of one or more binary values), where a given binary value indicates whether an increase or decrease is requested, as well as a magnitude of the indicated increase or decrease. As one example, a binary value of 1 may indicate an increase and a binary value of 0 may indicate a decrease. Alternatively, a binary value of 1 may indicate a decrease and a binary value of 0 may indicate an increase. In some cases, the modification indicator may indicate a request with respect to the power level and the allocated resources (e.g., an increase of the power level and an increase of the allocated resources, or a decrease of the power level and a decrease of the allocated resources).

In some cases, the base station 105-*a* may include a modification indicator table that maps the value indicated by the modification indicator to the requested change with respect to the aspect of the physical downlink resource. Accordingly, the modification indicator table may map at least a portion of the value of the modification indicator to an increase or a decrease and a magnitude of the increase or decrease. Additionally, the modification indicator table may map at least a portion of the value of the modification indicator to a power level associated with the physical downlink resource or resources allocated to the physical downlink resource, or both.

In some examples, UE 115-*a* transmitting the capability parameter 215 to base station 105-*a* may include UE 115-*a* transmitting an index value. In some cases, the index value may correspond to a capability table, where each row in the capability table indicates one or more parameters supported by UE 115-*a*. Table 1 below provides one example of a capability table.

In some examples, the capability table (e.g., table 1) may include a column that indicates an index value in relation to a given predictive retransmission feedback configuration. In some cases, a given index may indicate a maximum TBS size, or a maximum code rate, or a minimum time constraint to feedback early ACK/NACK, or a false alarm (FA) rate, or a missed detection (MD) rate, or a multiple feedback indicator, or any combination thereof. In some cases, the multiple feedback indicator may indicate whether UE 115-*a* supports transmitting multiple predictive retransmission feedbacks per data transmission (e.g., support for multiple ACK/NACK predictions for a given data transmission, support for multiple ACK/NACK predictions for data transmission 225).

In the provided example, when capability parameter 215 indicates index 3, then UE 115-*a* indicates to base station 105-*a* that UE 115-*a* supports 5K Max TBS, a maximum code rate of 0.2, a minimum time of 1 ms, a 0.01% false alarm (FA) rate, 0.001% miss detection (MD) rate, and that multiple feedback is supported.

TABLE 1

| Index | Maximum TBS | Maximum Code Rate | Minimum Time | FA Rate | MD Rate | Multiple Feedback |
|---|---|---|---|---|---|---|
| 0 | 10k | 0.3 | 1 ms | 0.01% | 0.1% | Yes |
| 1 | 10 | 0.3 | 2 ms | 0.001% | 0.01% | Yes |
| 2 | 5k | 0.5 | 2 ms | 0.01% | 0.001% | No |
| 3 | 5k | 0.6 | 1 ms | 0.01% | 0.001% | Yes |
| 4 | 1k | 0.7 | 0.2 ms | 0.001% | 0.001% | Yes |
| 5 | 1k | 0.8 | 0.1 ms | 0.001% | 0.0001% | No |

In some examples, the base station 105-*a* may interpret receiving at least one index of a capability table (e.g., table 1) from UE 115-*a* as an indication to base station 105-*a* that UE 115-*a* supports predictive retransmission feedback operations. In some cases, a binary flag in a message field (e.g., a binary flag in a message field of a radio resource control message, or uplink control information message, or MAC-CE message, or capability parameter 215, or any combination thereof) may indicate that UE 115-*a* supports predictive retransmission feedback operations.

In some examples, UE 115-*a* transmitting the capability parameter 215 to base station 105-*a* may include UE 115-*a* transmitting an index value in a RRC message information element. In some cases, the index value may include some number of binary digits (e.g., a 3 digit binary index value indicates 8 possible index capabilities, etc.).

In some cases, UE 115-*a* may determine a probability whether a packet (e.g., a packet of data transmission 225) is likely to result in an ACK or a NACK based on a machine learning model. The machine learning model may be based on machine learning training (e.g., previous machine learning iterations of HARQ feedback results based on decoding of packets by a channel decoder, etc.). In some cases, UE 115-*a* may predict the HARQ feedback (e.g., likelihood of ACK or likelihood of NACK) based on the probability determination. In some cases, the UE 115-*a* may transmit the predictive retransmission feedback 230 (e.g., predicted ACK or predicted NACK) to base station 105-*a*. In some cases, the UE 115-*a* may transmit the predictive retransmission feedback 230 to the base station 105-*a* for a packet of data transmission 225 before the UE 115-*a* finishes decoding the packet of data transmission 225.

In some cases, the UE 115-*a* may determine a probability score in relation to the predictive retransmission feedback 230. The probability score may range from 0 to 1. The probability score may indicate a probability of ACK or NACK resulting from the decoding of a packet of data transmission 225 received by the UE 115-*a*. A probability score or 0.6 for an ACK may indicate a 60% probability that the decoded packet is likely to result in an ACK (e.g., 40% probability that the decoded packet is likely to result in a NACK). A probability score of 0.3 for a NACK may indicate a 30% probability that the decoded packet is likely to result in a NACK (e.g., 70% probability that the decoded packet is likely to result in an ACK). In some cases, the predictive retransmission feedback 230 may include a probability score computed by UE 115-*a*. In some cases, the predictive retransmission feedback 230 may include the computed probability score and the predicted HARQ feedback (e.g., predicted ACK, predicted NACK).

Based on the probability determination, the UE 115-*a* may transmit predicted predictive retransmission feedback 230 (e.g., ACK or NACK) to the base station 105-*a* for a packet of data transmission 225 before the UE 115-*a* finishes decoding the packet. The predictive retransmission feedback 230 may include multiple benefits. The benefits of the predictive retransmission feedback 230 may include a decrease in the latency associated with HARQ feedback procedures, improving link quality, improving link performance, decreasing a latency of resource scheduling, and improving an efficiency of resource scheduling, etc.

Figure 2B:
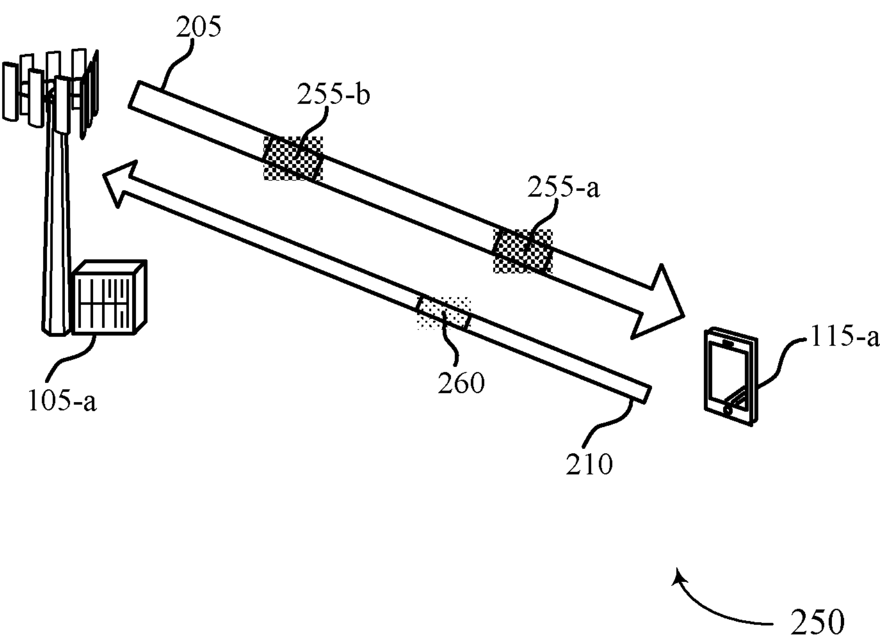

FIG. 2B illustrates an example of a wireless communications system 250 that supports machine learning assisted predictive retransmission feedback in accordance with aspects of the present disclosure.

In some cases, the UE 115-*a* may receive a first portion 255-*a* of a data transmission from the base station 105-*a* and receive a second portion 255-*b* of the data transmission after receiving the first portion 255-*a*. In some cases, the first portion 255-*a* may be a first portion of a data packet and the second portion 255-*b* may be a second portion of the data packet. In some cases, the first portion 255-*a* may be a first packet of the data transmission and the second portion 255-*b* may be a second packet of the data transmission.

In some cases, the UE 115-*a* may transmit to the base station 105-*a* a predictive retransmission feedback 260 associated with first portion 255-*a*. In some cases, the UE 115-*a* may compute the predictive retransmission feedback 260 prior to the UE 115-*a* completing a decoding of the data transmission associated with first portion 255-*a* (e.g., prior to UE 115-*a* completing a decoding of first portion 255-*a*, or prior to UE 115-*a* receiving second portion 255-*b*, or prior to UE 115-*a* receiving and completing a decoding of second portion 255-*b*).

Figure 3:
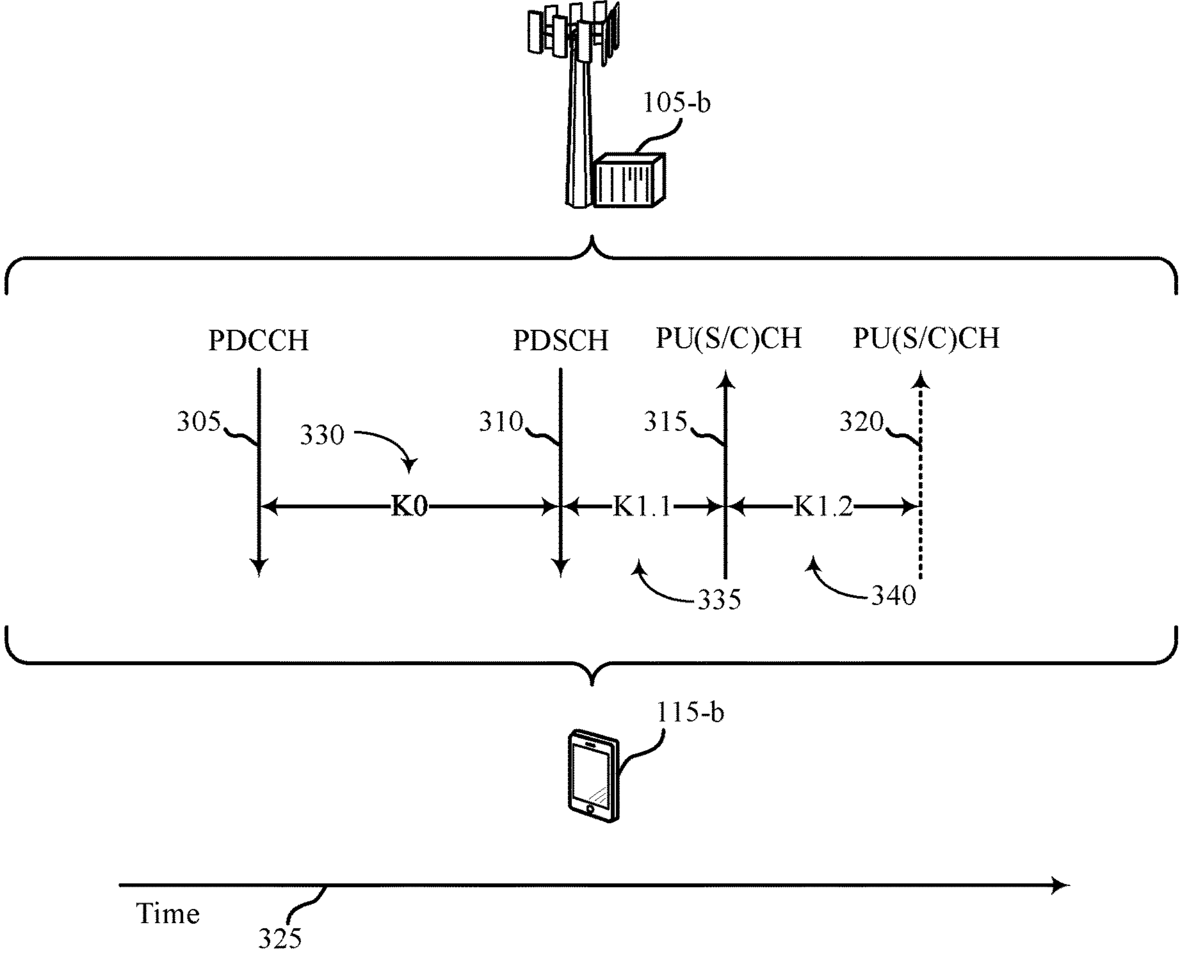
FIG. 3 illustrates an example of a timing structure that supports machine learning assisted predictive retransmission feedback in accordance with aspects of the present disclosure.

FIG. 3 illustrates an example of a timing structure 300 that supports machine learning assisted predictive retransmission feedback in accordance with aspects of the present disclosure.

As illustrated, timing structure 300 may include base station 105-*b* and UE 115-*b*, which may be examples of a UE 115 or a base station 105, as described herein. The timing structure 300 may include a physical downlink control channel (PDCCH) 305 (e.g., control information), followed by a physical downlink shared channel (PDSCH) 310 (e.g., data message). As shown, timing structure 300 may also include physical uplink channel 315 (e.g., PUSCH or PUCCH). In some cases, timing structure 300 may optionally include physical uplink channel 320 (e.g., PUSCH or PUCCH). In some cases, at least some operations associated with timing structure 300 may occur in the time domain (e.g., along timeline 325).

In the illustrated example, base station 105-*b* may transmit PDCCH 305 to UE 115-*b*. In some cases, base station 105-*b* may transmit PDSCH 310 to UE 115-*b* after a delay K0 330. In some cases, UE 115-*b* may transmit the physical uplink channel 315 to base station 105-*b* after a delay K1.1 335. In some cases, UE 115-*b* may optionally transmit the physical uplink channel 320 to base station 105-*b* after a delay K1.2 340. In some cases, delay K1.1 335 may be a first instance of a delay K1 and delay K1.2 340 may be an optional second instance of the delay K1 (e.g., delay K1.2 340 may equal delay K1.1 335). In some cases, the configured value of delay K1.1 335 may differ from the configured value of delay K1.2 340.

In some cases, K0 330, K1.1 335, and K1.2 340 may be time domain resource parameters or TDD parameters. In some cases, K0 330, K1.1 335, and K1.2 340 may be referred to as slot offset indications. In some cases, delays K0 330, K1.1 335, and K1.2 340 may indicate dynamic scheduling timings that determine delays between various paired control and data transmissions. In some cases, delays K0 330, K1.1 335, and K1.2 340 may be timing parameters that are configured by base station 105-*b* or the UE 115-*b*, or both, for the scheduling of retransmission feedback messages (e.g., physical uplink channel 315, physical uplink channel 320). In some cases, delays K0 330, K1.1 335, and K1.2 340 may be based on the processing timing of the base station 105-*b*, or the processing timing of the UE 115-*b*, or the end to end latency between the base station 105-*b* and the UE 115-*b*, or any combination thereof. In some cases, the base station 105-*b* may communicate timing information associated with delays K0 330, K1.1 335, and K1.2 340 to UE 115-*b*. In some cases, UE 115-*b* may compute the delays K0 330, K1.1 335, and K1.2 340 based on the received timing information.

In some examples, the UE 115-*b* may transmit a capability parameter to the base station 105-*b* that indicates one or more predictive retransmission feedback capabilities of the UE 115-*b*. In some cases, the base station 105-*b* may then transmit an activation indicator to the UE 115-*b* that indicates a predictive retransmission feedback procedure is enabled. In some cases, the base station may transmit the activation indicator on PDCCH 305. The base station 105-*b* may then transmit data to the UE 115-*b*. In some cases, the base station 105-*b* may transmit the data on PDSCH 310. Thus, the base station 105-*b* may transmit the data to the UE 115-*b* after delay K0 330.

In some examples, prior to the UE 115-*b* completing a decoding of the data that the UE 115-*b* receives from the base station 105-*b*, the UE 115-*b* may compute a predictive retransmission feedback in accordance with information indicated in the activation indicator. In some cases, the predictive retransmission feedback may include a prediction of whether the outcome of the completed decoding of the data is likely to result in an ACK feedback or a NACK feedback. In some cases, the UE 115-*b* may compute the predictive retransmission feedback for a data packet after the UE 115-*b* receives a portion of the data packet (e.g., prior to the UE 115-*b* receiving the complete data packet from the base station 105-*b*).

In some examples, the UE 115-*b* may transmit the computed predictive retransmission feedback associated with the data to the base station 105-*b*. In some cases, the UE 115-*b* may transmit the computed predictive retransmission feedback on physical uplink channel 315. As shown, the UE 115-*b* may transmit the computed predictive retransmission feedback on physical uplink channel 315 after delay K1.1 335.

In some examples, the UE 115-*b* may transmit a single predictive retransmission feedback for each data transmission transmitted by the base station 105-*b*. Alternatively, the UE 115-*b* may transmit two or more predictive retransmission feedback for each data transmission transmitted by the base station 105-*b*. Accordingly, for the data transmitted by the base station 105-*b* on PDSCH 310, the UE 115-*b* may compute a predictive retransmission feedback of the data and then transmit a first instance of the computed predictive retransmission feedback on physical uplink channel 315 after delay K1.1 335, and then transmit a second instance of the computed predictive retransmission feedback on physical uplink channel 320 after delay K1.2 340.

In some examples, UE 115-*b* may compute two or more predictive retransmission feedbacks for each data transmission transmitted by the base station 105-*b*. In some cases, after receiving at least a first portion of the data transmitted by the base station 105-*b* on PDSCH 310, the UE 115-*b* may compute a first predictive retransmission feedback for this at least first portion of the data and then transmit the first predictive retransmission feedback on physical uplink channel 315 after delay K1.1 335. In some cases, after receiving at least a second portion of the data transmitted by the base station 105-*b* on PDSCH 310, the UE 115-*b* may optionally compute a second predictive retransmission feedback (e.g., physical uplink channel 320) for at least this second portion of the data and then optionally transmit the second predictive retransmission feedback on physical uplink channel 320 after delay K1.2 340. In some cases, the UE 115-*b* may optionally compute the second predictive retransmission feedback based on the at least first portion of the data and the at least second portion of the data. After computing the second predictive retransmission feedback, the UE 115-*b* may optionally transmit the second predictive retransmission feedback on physical uplink channel 320 after delay K1.2 340. In some cases, the UE 115-*b* may compute the first predictive retransmission feedback at some time during the delay K1.1 335. In some cases, the UE 115-*b* may compute the second predictive retransmission feedback at some time during the delay K1.1 335 or at some time during the delay K1.2 340.

Figure 4:
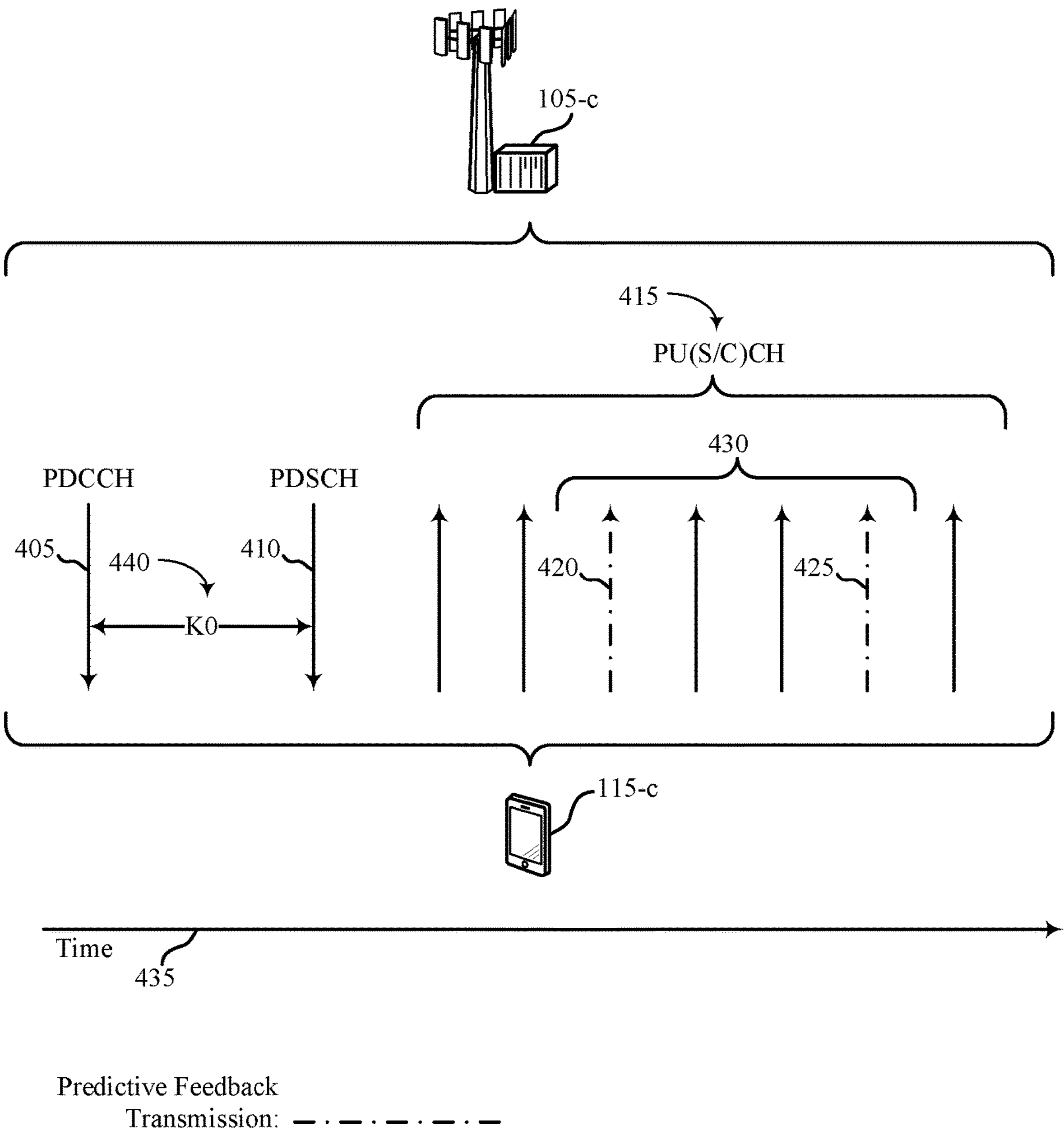
FIG. 4 illustrates an example of a timing structure that supports machine learning assisted predictive retransmission feedback in accordance with aspects of the present disclosure.

FIG. 4 illustrates an example of a timing structure 400 that supports machine learning assisted predictive retransmission feedback in accordance with aspects of the present disclosure.

In some examples, a base station 105-*c* may receive a capability parameter from a UE 115-*c*. Based on receiving the capability parameter, the base station 105-*c* may schedule a data transmission and physical uplink resources (e.g., one or more physical uplink channels 415) for predictive retransmission feedback procedures. As shown, transmission of the one or more physical uplink channels 415 of a physical uplink resource set begins after base station 105-*c* transmits PDSCH 410 and ends according to a configuration of the physical resource. In some cases, base station 105-*c* may configure the start time and end time of the one or more physical uplink channels 415. In some cases, base station 105-*c* may configure the start time, end time, and period of the one or more physical uplink channels 415.

In some examples, base station 105-*c* may transmit a message (e.g., via RRC or MAC-CE) that indicates a configuration of the one or more physical uplink channels 415. In some cases, the message may indicate (start, end, period) to UE 115-*c*, where "start" indicates the start time of the one or more physical uplink channels 415, "end" indicates the end time of the one or more physical uplink channels 415, and "period" indicates the period associated with the one or more physical uplink channels 415. In some examples, base station 105-*c* may transmit a message of (5, 10, 2) to indicate starting the one or more physical uplink channels 415 at the 5th slot, ending the one or more physical uplink channels 415 at the 10th slot, and a period of 2 slots. Based on this configuration, the UE 115-*c* may determine that a predictive retransmission feedback (e.g., physical uplink channel 420, physical uplink channel 425) may be sent at the 5th slot, or the 7th slot, or the 9th slot, or any combination thereof. Based on this configuration, the UE 115-*c* may determine that a first possible slot for a predictive retransmission feedback is the 5th slot and a last possible slot for a predictive retransmission feedback is the 9th slot.

In some cases, an activation indicator transmitted by the base station 105-*c* to the UE 115-*c* may indicate the scheduling of the data transmission and physical uplink resources. In some cases, the base station 105-*c* may transmit the activation indicator on PDCCH 405. The base station 105-*c* may then transmit data to the UE 115-*c*. In some cases, the base station 105-*c* may transmit the data on PDSCH 410. As shown, the base station 105-*c* may transmit the data to the UE 115-*c* after delay K0 440. In some cases, at least some operations associated with timing structure 400 may occur in the time domain (e.g., along timeline 435).

In the illustrated example, the base station 105-*c* may schedule the physical uplink resources to occur periodically (e.g., the one or more physical uplink channels 415 configured as periodic physical uplink resources). In some cases, the periodicity of the one or more physical uplink channels 415 may be preconfigured by the base station 105-*c*.

In some examples, a reporting window 430 may be configured with respect to the one or more physical uplink channels 415. As shown, the reporting window 430 window may be configured to start after one or more physical uplink channel transmissions by UE 115-*c*. In some cases, base station 105-*c* may transmit a message (e.g., via RRC or MAC-CE) that indicates a configuration of the reporting window 430. In some cases, the message may indicate (start, window, period) to UE 115-*c*, where "start" indicates the start time of the reporting window 430, "window" indicates a window span of 5 slots, and "period" indicates a period associated with predictive retransmission feedbacks within reporting window 430. In some examples, base station 105-*c* may transmit a message of (5, 5, 2) to indicate starting the reporting window 430 at the 5th slot, the reporting window 430 spans 5 slots from the 5th slot, and a period of 2 slots for predictive retransmission feedbacks. Based on this configuration, the UE 115-*c* may determine that the reporting window 430 spans from the 5th slot to the 10th slot, and that a predictive retransmission feedback (e.g., physical uplink channel 420, physical uplink channel 425) may be sent at the 5th slot, or the 7th slot, or the 9th slot, or any combination thereof. Based on this configuration, the UE 115-*c* may determine that a first possible slot for a predictive retransmission feedback is the 5th slot and a last possible slot for a predictive retransmission feedback is the 9th slot.

In some cases, the reporting window 430 may be indicated via PDCCH 405 (e.g., in the activation indicator or in conjunction with the activation indicator). In some cases, the reporting window 430 may be associated with a constraint that the UE 115-*c* is to transmit a predictive retransmission feedback during the reporting window 430. In some cases, the constraint may be indicted via PDCCH 405 (e.g., in the activation indicator or in conjunction with the activation indicator).

In some examples, the base station 105-*c* may configure the predictive retransmission feedback procedure depicted by timing structure 400 to include a single predictive retransmission feedback from the UE 115-*c*. In the illustrated example, the base station 105-*c* may configure the predictive retransmission feedback procedure depicted by timing structure 400 to indicate that the single predictive retransmission feedback be transmitted by the UE 115-*c* on the earliest physical uplink resource of the one or more physical uplink channels 415 that occurs within reporting window 430. As shown, the earliest physical uplink resource of the one or more physical uplink channels 415 that occurs within reporting window 430 is physical uplink channel 420. Accordingly, the single predictive retransmission feedback may be transmitted by the UE 115-*c* on physical uplink channel 420.

In some examples, the base station 105-*c* may configure the predictive retransmission feedback procedure depicted by timing structure 400 to indicate that the single predictive retransmission feedback be transmitted by the UE 115-*c* on the last physical uplink resource of the one or more physical uplink channels 415 that occurs within reporting window 430. As shown, the last physical uplink resource of the one or more physical uplink channels 415 that occurs within reporting window 430 is physical uplink channel 425. Accordingly, the single predictive retransmission feedback may be transmitted by the UE 115-*c* on physical uplink channel 425.

In some examples, the base station 105-*c* may configure the predictive retransmission feedback procedure depicted by timing structure 400 to include multiple predictive retransmission feedbacks from the UE 115-*c*. In some cases, base station 105-*c* may transmit a message (e.g., via RRC or MAC-CE) that indicates a configuration of multiple predictive retransmission feedbacks. In some cases, the message may aggregate two or more configurations in the message. Thus, in the message to UE 115-*c*, base station 105-*c* may indicate the following: {(start1, end1, period1), (start2, end2, period2)}, where "start1" indicates the start time of a first set of the multiple predictive retransmission feedbacks, "end1" indicates the end time of the first set of the multiple predictive retransmission feedbacks, and "period1" indicates the period associated with the first set of the multiple predictive retransmission feedbacks. Likewise, "start2" indicates the start time of a second set of the multiple predictive retransmission feedbacks, "end2" indicates the end time of the second set of the multiple predictive retransmission feedbacks, and "period2" indicates the period associated with the second set of the multiple predictive retransmission feedbacks. Thus, based on this configuration UE 115-*c* may transmit a first set of one or more predictive retransmission feedbacks (e.g., physical uplink channel 420) and optionally transmit a second set of one or more predictive retransmission feedbacks (e.g., physical uplink channel 425)

In some cases, a predictive retransmission feedback transmitted by the UE 115-*c* may include a HARQ identifier (e.g., HARQ-ID) to avoid collisions, In some cases, the HARQ-ID may be carried together with the predictive retransmission feedback when the base station 105-*c* enables multiple predictive retransmission feedbacks (e.g., when multiple predictive retransmission feedbacks are transmitted within the same window such as reporting window 430). In some cases, the UE 115-*c* may transmit a single predictive retransmission feedback even though the UE 115-*c* is configured for multiple predictive retransmission feedbacks.

In some examples, the base station 105-*c* may configure predictive retransmission feedback procedure depicted by timing structure 400 to indicate that the multiple predictive retransmission feedbacks be transmitted by the UE 115-*c* on any of the physical uplink resources of the one or more physical uplink channels 415. Accordingly, at least one of the multiple predictive retransmission feedbacks may be transmitted by the UE 115-*c* on any one of the one or more physical uplink channels 415.

In some example, the base station 105-*c* may configure predictive retransmission feedback procedure depicted by timing structure 400 to indicate that the multiple predictive retransmission feedbacks be transmitted by the UE 115-*c* on any of the physical uplink resources of the one or more physical uplink channels 415 that occurs within reporting window 430. Accordingly, at least one of the multiple predictive retransmission feedbacks may be transmitted by the UE 115-*c* on physical uplink channel 420, or on physical uplink channel 425, or any of the physical uplink channels within reporting window 430.

In some examples, the base station 105-*c* may configure the predictive retransmission feedback procedure depicted by timing structure 400 to indicate that the first of the multiple predictive retransmission feedbacks be transmitted by the UE 115-*c* on the earliest physical uplink resource of the one or more physical uplink channels 415 that occurs within reporting window 430. Accordingly, the first of the multiple predictive retransmission feedbacks may be transmitted by the UE 115-*c* on physical uplink channel 420.

In some examples, the base station 105-*c* may configure the predictive retransmission feedback procedure depicted by timing structure 400 to indicate that a predictive retransmission feedback of the multiple predictive retransmission feedbacks be transmitted by the UE 115-*c* on the last physical uplink resource of the one or more physical uplink channels 415 that occurs within reporting window 430. Accordingly, the last predictive retransmission feedback of the multiple predictive retransmission feedbacks may be transmitted by the UE 115-*c* on physical uplink channel 425.

Figure 5:
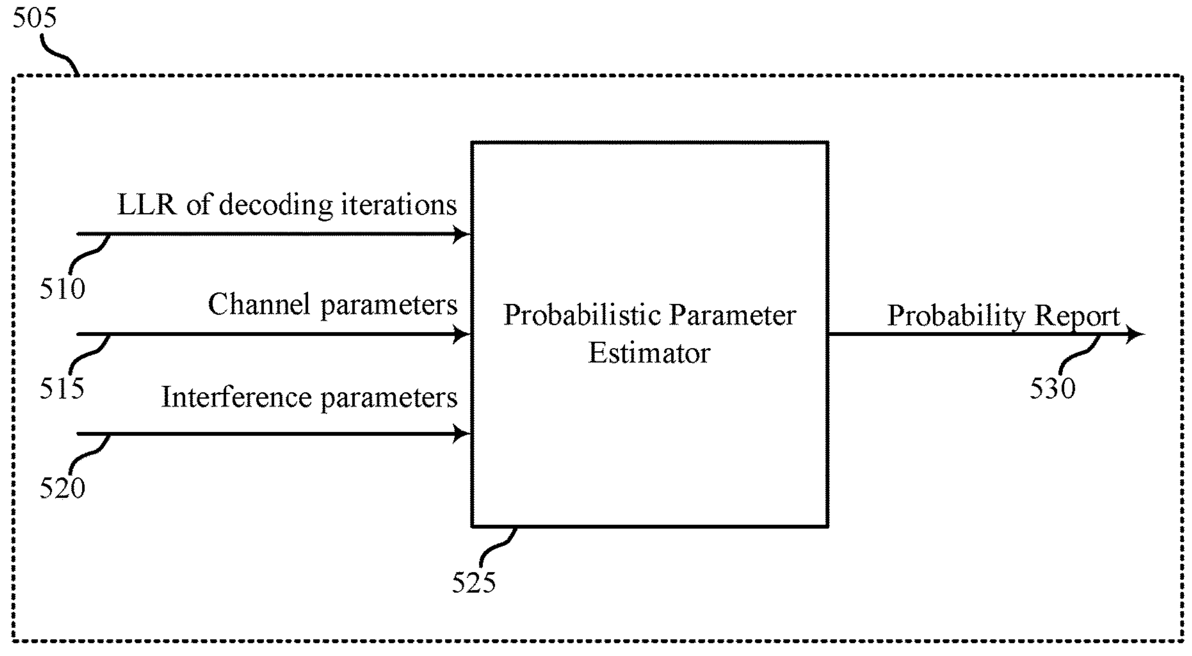
FIG. 5 illustrates an example of a block diagram that supports machine learning assisted predictive retransmission feedback in accordance with aspects of the present disclosure.

FIG. 5 illustrates an example of a block diagram 500 that supports machine learning assisted predictive retransmission feedback in accordance with aspects of the present disclosure.

As illustrated, block diagram 500 may include a UE 505. UE 505 may be an example of a UE 115 as described herein. In some cases, the UE 505 may be configured to transmit a probability report 530 to the base station. In some cases, the UE 505 may transmit the probability report 530 in addition to or instead of a predicted ACK or a predicted NACK. In some cases, the base station may receive the probability report 530 and then determine whether a predicted ACK or a predicted NACK is the more likely outcome of the UE 505 decoding data transmitted by the base station to UE 505. In some cases, the probability report 530 may include one or more estimated parameters (e.g., predictive ACK/NACK feedback, decoding probability, a delta value that indicates a request for additional resources, a delta value that indicates over-allocated resources, etc.).

In some examples, the UE 505 may generate the probability report 530 based on one or more inputs into a probabilistic parameter estimator 525. The one or more inputs may include a log-likelihood ratio (LLR) 510 of one or more decoding iterations, or channel parameters 515, or interference parameters 520, or any combination thereof.

In some examples, the UE 505 may receive data from the base station. The UE 505 may perform one or more decoding iterations on the received data. Before completing the decoding of the data, the UE 505 may compute the LLR 510 for one or more decoding iterations. In some cases, UE 505 may receive the computed LLR 510 as an input to probabilistic parameter estimator 525 and compute the probability report 530 based on the computed LLR 510.

In some examples, the UE 505 may determine channel parameters 515 in relation to UE 505 receiving one or more transmission from the base station (e.g., data from the base station, control information, etc.). In some cases, channel parameters 515 may include a signal measurement (e.g., signal strength, signal power level), or a channel quality, or any combination thereof. In some cases, UE 505 may receive the channel parameters 515 as an input to probabilistic parameter estimator 525 and compute the probability report 530 based on the channel parameters 515.

In some examples, the UE 505 may determine interference parameters 520 in relation to UE 505 receiving one or more transmission from the base station (e.g., data from the base station, control information, etc.). In some cases, interference parameters 520 may include a signal to noise ratio (SNR), or signal-to-interference-plus-noise ratio (SINR), or signal-to-noise-plus-interference ratio (SNIR), or any combination thereof. In some cases, UE 505 may receive the interference parameters 520 as an input to probabilistic parameter estimator 525 and compute the probability report 530 based on the interference parameters 520.

In some examples, the UE 505 may transmit the computed probability report 530 to the base station based on a data transmission that UE 505 receives from the base station. In some cases, the UE 505 may transmit the computed probability report 530 to the base station before UE 505 finishes decoding the packet. The computed probability report 530 may include multiple benefits. The benefits of the computed probability report 530 may include a decrease in the latency associated with HARQ feedback procedures, improving link quality, improving link performance, decreasing a latency of resource scheduling, and improving an efficiency of resource scheduling, etc.

Figure 6:
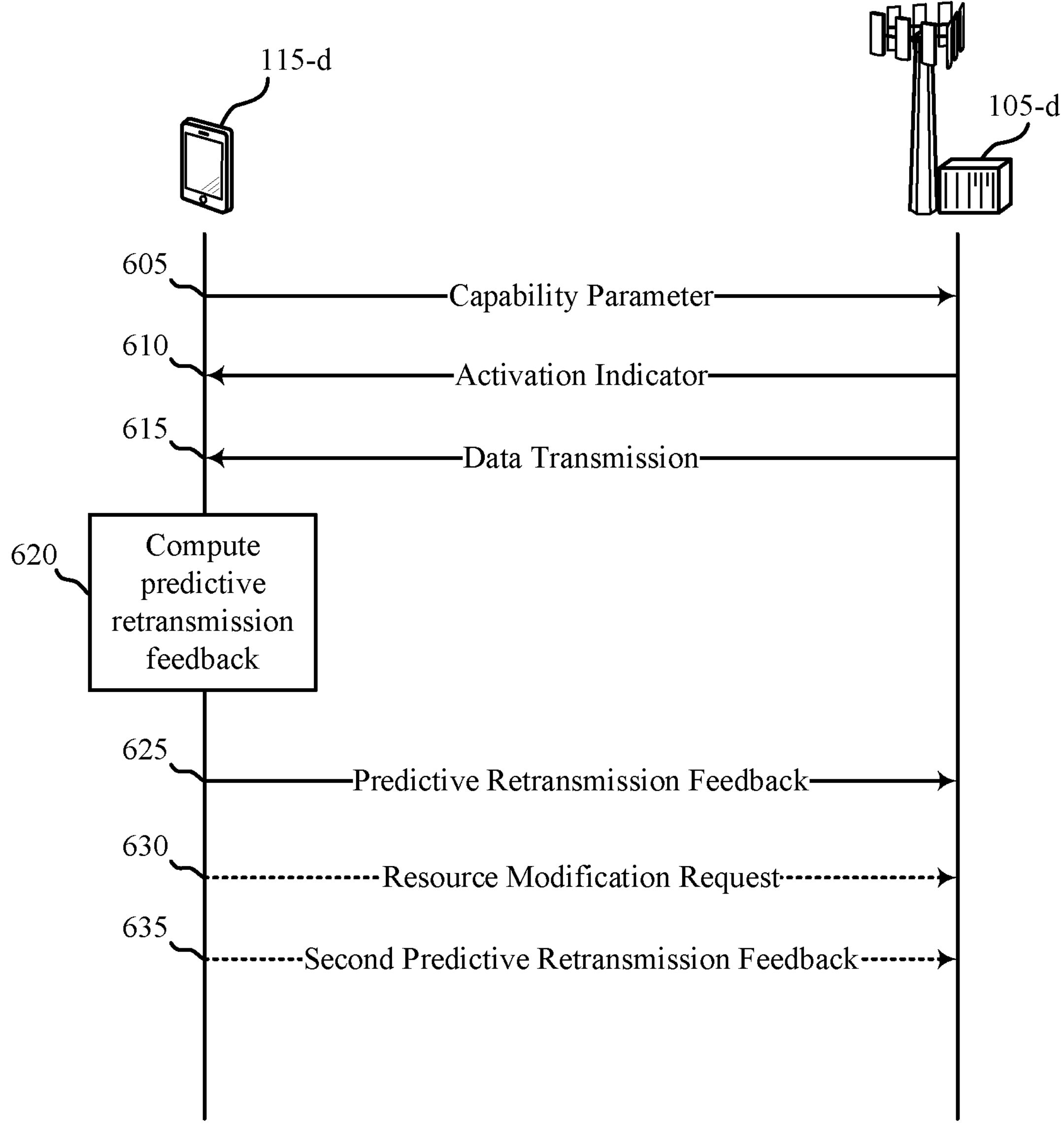
FIG. 6 illustrates an example of a process flow that supports machine learning assisted predictive retransmission feedback in accordance with aspects of the present disclosure.

FIG. 6 illustrates an example of a process flow 600 that supports machine learning assisted predictive retransmission feedback in accordance with aspects of the present disclosure.

As illustrated, process flow 600 may include UE 115-*d* and base station 105-*d*, any of which may be an example of a UE 115 or base station 105, respectively, as described herein with reference to FIGS. 1, 2A, and 2B or wireless device 505 of FIG. 5.

At 605, UE 115-*d* may transmit a capability parameter to base station 105-*d*. The capability parameter may indicate one or more predictive retransmission feedback capabilities of the UE 115-*d*. In some cases, UE 115-*d* may transmit the capability parameter to the base station 105-*d* via radio resource control signaling, or uplink control information, or MAC-CE, or any combination thereof.

At 610, base station 105-*d* may transmit an activation indicator to UE 115-*d*. In some cases, the activation indicator may indicate that a predictive retransmission feedback procedure is enabled by the base station 105-*d*. In some cases, UE 115-*d* may receive the activation indicator from the base station 105-*d* via downlink control information, or MAC-CE, or radio resource control signaling, or any combination thereof.

At 615, base station 105-*d* may transmit a data transmission to UE 115-*d*. In some cases, the data transmission may include one or more data packets.

At 620, UE 115-*d* may compute a predictive retransmission feedback of the data transmission before UE 115-*d* performs a complete decoding of the data transmission. In some cases, UE 115-*d* may compute the predictive retransmission feedback in accordance with the activation indicator.

At 625, UE 115-*d* may transmit the predictive retransmission feedback computed at 620 to base station 105-*d*. In some cases, UE 115-*d* may transmit the predictive retransmission feedback on a physical uplink resource indicated by the activation indicator.

At 630, the UE 115-*d* may optionally transmit a resource modification request. In some cases, in response to computing the predictive retransmission feedback at 620 the UE 115-*d* may determine that the base station 105-*d* should increase or decrease an aspect of a physical downlink resource (e.g., a request to increase or decrease an aspect of a physical uplink resource indicated by the activation indicator in response to computing the predictive retransmission feedback). Accordingly, UE 115-*d* may transmit resource modification request to base station 105-*d* to increase or decrease an aspect of a physical downlink resource in response to computing the predictive retransmission feedback at 620.

At 635, the UE 115-*d* may optionally transmit a second predictive retransmission feedback to base station 105-*d*. In some cases, UE 115-*d* may compute the second predictive retransmission feedback after computing the predictive retransmission feedback at 620. In some cases, UE 115-*d* may transmit the predictive retransmission feedback computed at 620 on a first physical uplink resource indicated by the activation indicator and transmit the second predictive retransmission feedback on a second physical uplink resource indicated by the activation indicator.

Figure 7:
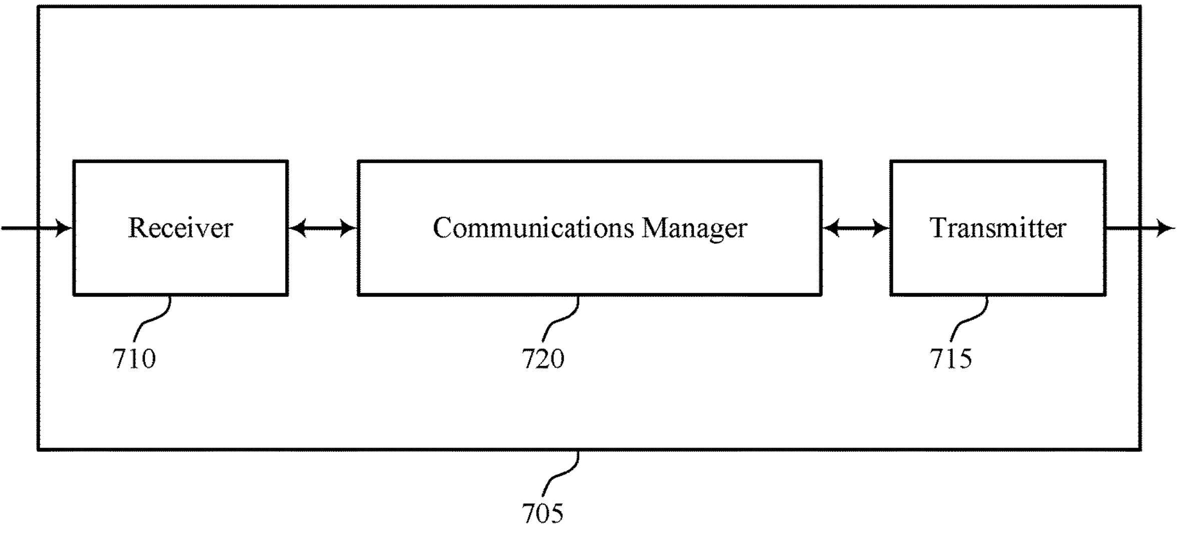
FIGS. 7 and 8 show block diagrams of devices that support machine learning assisted predictive retransmission feedback in accordance with aspects of the present disclosure.

FIG. 7 shows a block diagram 700 of a device 705 that supports machine learning assisted predictive retransmission feedback in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to machine learning assisted predictive retransmission feedback). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to machine learning assisted predictive retransmission feedback). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of machine learning assisted predictive retransmission feedback as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for transmitting, to a base station, a capability parameter indicating one or more predictive retransmission feedback capabilities of the UE. The communications manager 720 may be configured as or otherwise support a means for receiving, from the base station, an activation indicator that indicates a predictive retransmission feedback procedure is enabled. The communications manager 720 may be configured as or otherwise support a means for receiving data from the base station. The communications manager 720 may be configured as or otherwise support a means for transmitting a predictive retransmission feedback associated with the data to the base station, the predictive retransmission feedback being computed, in accordance with the activation indicator, prior to completing a decoding of the data.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for predictive retransmission feedback. The benefits of the techniques for predictive retransmission feedback may include a decrease in the latency associated with HARQ feedback procedures, reducing processing, reducing power consumption, and increasing efficient utilization of communication resources.

Figure 8:
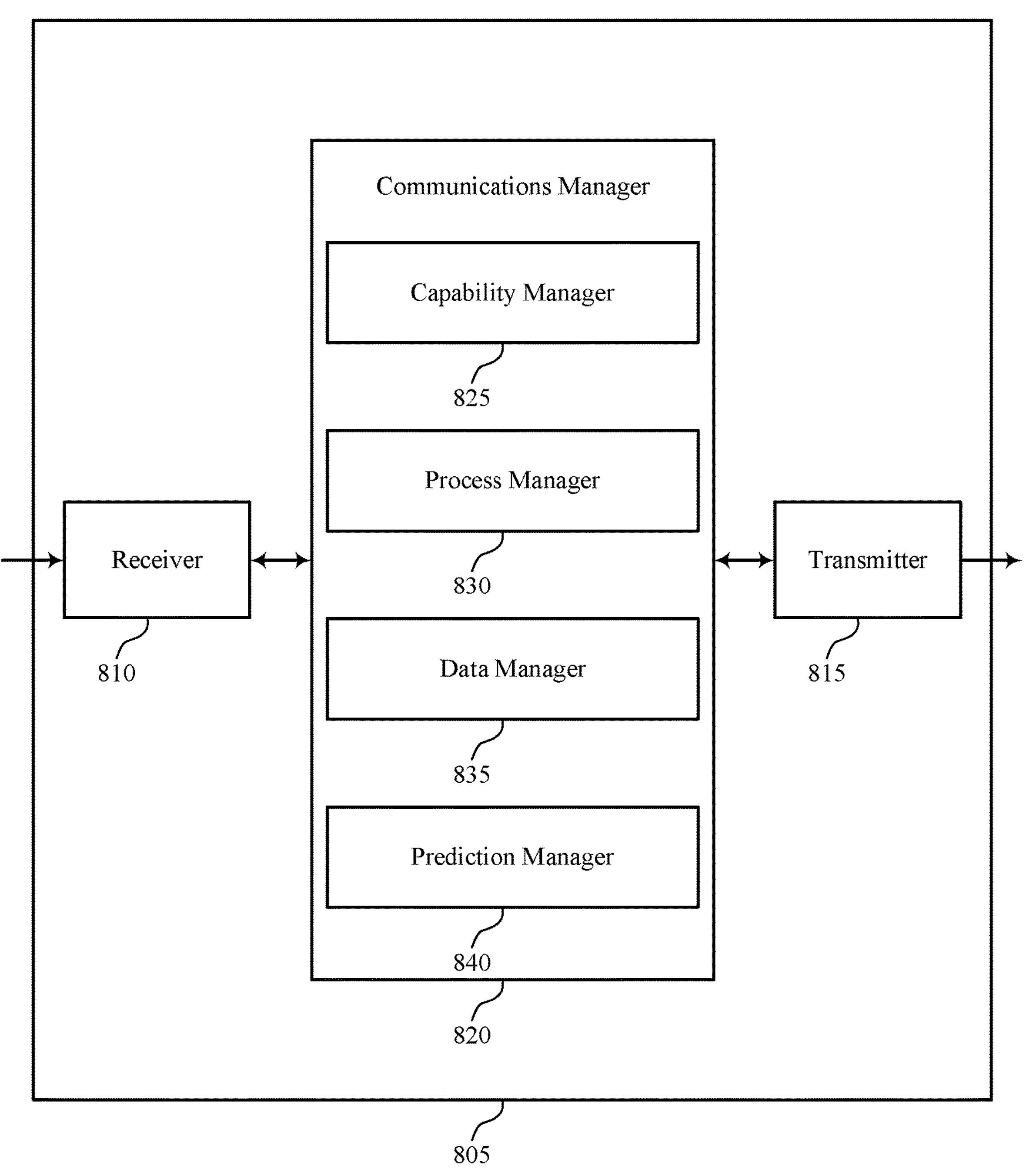

FIG. 8 shows a block diagram 800 of a device 805 that supports machine learning assisted predictive retransmission feedback in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to machine learning assisted predictive retransmission feedback). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to machine learning assisted predictive retransmission feedback). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of machine learning assisted predictive retransmission feedback as described herein. For example, the communications manager 820 may include a capability manager 825, a process manager 830, a data manager 835, a prediction manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The capability manager 825 may be configured as or otherwise support a means for transmitting, to a base station, a capability parameter indicating one or more predictive retransmission feedback capabilities of the UE. The process manager 830 may be configured as or otherwise support a means for receiving, from the base station, an activation indicator that indicates a predictive retransmission feedback procedure is enabled. The data manager 835 may be configured as or otherwise support a means for receiving data from the base station. The prediction manager 840 may be configured as or otherwise support a means for transmitting a predictive retransmission feedback associated with the data to the base station, the predictive retransmission feedback being computed, in accordance with the activation indicator, prior to completing a decoding of the data.

Figure 9:
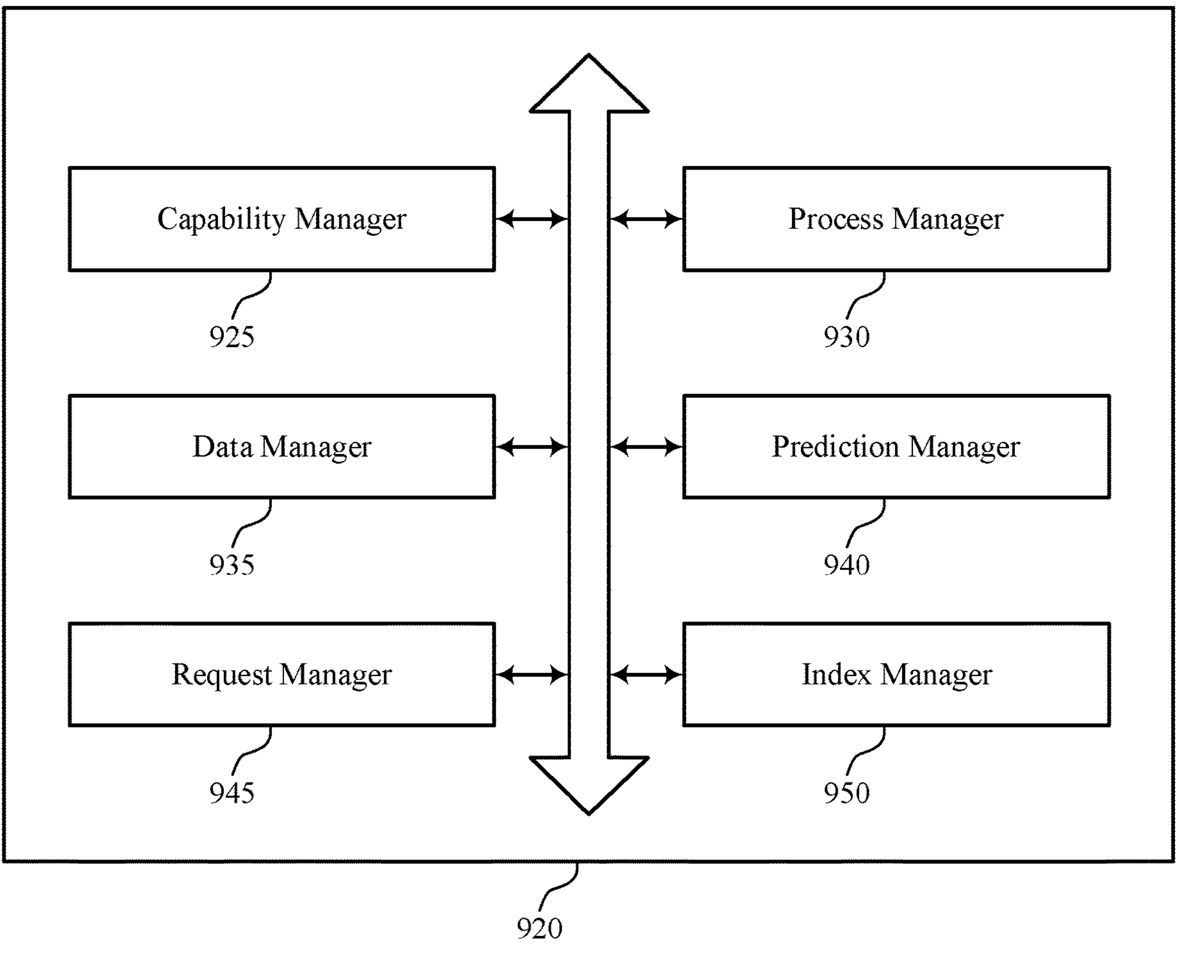
FIG. 9 shows a block diagram of a communications manager that supports machine learning assisted predictive retransmission feedback in accordance with aspects of the present disclosure.

FIG. 9 shows a block diagram 900 of a communications manager 920 that supports machine learning assisted predictive retransmission feedback in accordance with aspects of the present disclosure. The communications manager 920 may be an example of aspects of a communications manager 720, a communications manager 820, or both, as described herein. The communications manager 920, or various components thereof, may be an example of means for performing various aspects of machine learning assisted predictive retransmission feedback as described herein. For example, the communications manager 920 may include a capability manager 925, a process manager 930, a data manager 935, a prediction manager 940, a request manager 945, an index manager 950, or any combination thereof. Each of these components may communicate, directly or indirectly, with one another (e.g., via one or more buses).

The communications manager 920 may support wireless communication at a UE in accordance with examples as disclosed herein. The capability manager 925 may be configured as or otherwise support a means for transmitting, to a base station, a capability parameter indicating one or more predictive retransmission feedback capabilities of the UE. The process manager 930 may be configured as or otherwise support a means for receiving, from the base station, an activation indicator that indicates a predictive retransmission feedback procedure is enabled. The data manager 935 may be configured as or otherwise support a means for receiving data from the base station. The prediction manager 940 may be configured as or otherwise support a means for transmitting a predictive retransmission feedback associated with the data to the base station, the predictive retransmission feedback being computed, in accordance with the activation indicator, prior to completing a decoding of the data.

In some examples, the capability manager 925 may be configured as or otherwise support a means for transmitting the capability parameter to the base station via radio resource control signaling, or uplink control information, or MAC-CE, or any combination thereof.

In some examples, the process manager 930 may be configured as or otherwise support a means for receiving the activation indicator from the base station via downlink control information, or MAC-CE, or radio resource control signaling, or any combination thereof.

In some examples, the prediction manager 940 may be configured as or otherwise support a means for transmitting a first predictive retransmission feedback on a first physical uplink resource indicated via the activation indicator. In some examples, the prediction manager 940 may be configured as or otherwise support a means for transmitting a second predictive retransmission feedback on a second physical uplink resource indicated via the activation indicator.

In some examples, the request manager 945 may be configured as or otherwise support a means for transmitting, to the base station, a request to increase or decrease an aspect of a physical downlink resource indicated via the activation indicator in response to computing the predictive retransmission feedback.

In some examples, the request includes a modification indicator selected from a set of modification index values, and where when the predictive retransmission feedback indicates a non-acknowledgement feedback the modification indicator is configured with a first index value to indicate a degree of increase with respect to the aspect of the physical downlink resource, and when the predictive retransmission feedback includes an acknowledgement feedback the modification indicator is configured with a second index value to indicate a degree of decrease with respect to the aspect of the physical downlink resource.

In some examples, the index manager 950 may be configured as or otherwise support a means for selecting at least one index of a capability table, each index of the capability table including one or more configured (e.g., preconfigured) capability parameters. In some examples, the index manager 950 may be configured as or otherwise support a means for transmitting the selected at least one index to the base station.

In some examples, the process manager 930 may be configured as or otherwise support a means for determining that the activation indicator indicates a physical uplink resource for a single predictive retransmission feedback per data transmission or indicates physical uplink resources for multiple predictive retransmission feedbacks per data transmission.

In some examples, the process manager 930 may be configured as or otherwise support a means for determining that the activation indicator indicates a slot offset for each physical uplink resource scheduled for the predictive retransmission feedback procedure associated with the data.

In some examples, the process manager 930 may be configured as or otherwise support a means for determining that the activation indicator indicates a configuration of the predictive retransmission feedback procedure or a periodic physical uplink resource pre-configured for the predictive retransmission feedback procedure, or determining that the activation indicator indicates both.

Figure 10:
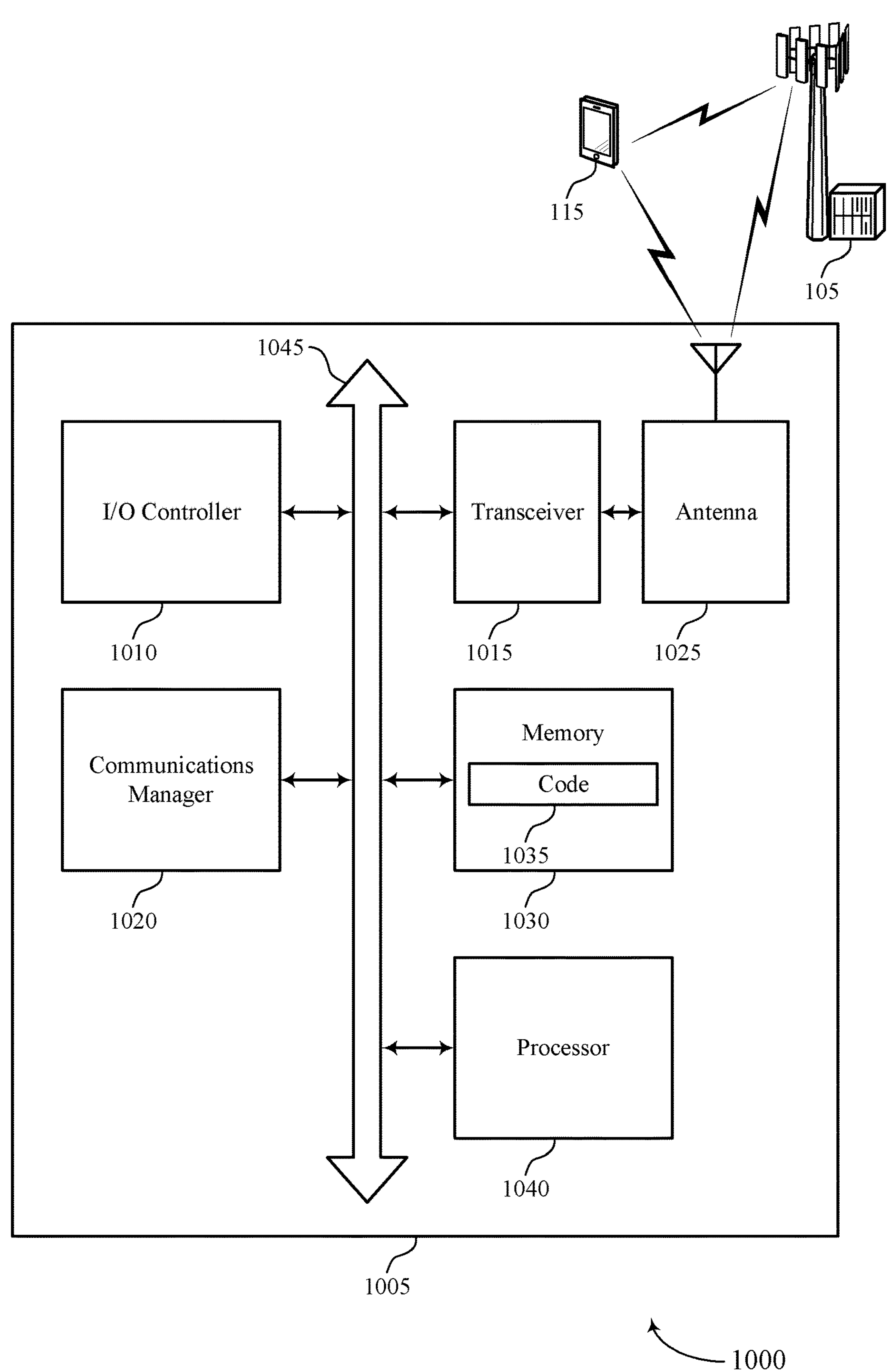
FIG. 10 shows a diagram of a system including a device that supports machine learning assisted predictive retransmission feedback in accordance with aspects of the present disclosure.

FIG. 10 shows a diagram of a system 1000 including a device 1005 that supports machine learning assisted predictive retransmission feedback in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting machine learning assisted predictive retransmission feedback). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for transmitting, to a base station, a capability parameter indicating one or more predictive retransmission feedback capabilities of the UE. The communications manager 1020 may be configured as or otherwise support a means for receiving, from the base station, an activation indicator that indicates a predictive retransmission feedback procedure is enabled. The communications manager 1020 may be configured as or otherwise support a means for receiving data from the base station. The communications manager 1020 may be configured as or otherwise support a means for transmitting a predictive retransmission feedback associated with the data to the base station, the predictive retransmission feedback being computed, in accordance with the activation indicator, prior to completing a decoding of the data.

By including or configuring the communications manager 1020 in accordance with examples as described herein, the device 1005 may support techniques for predictive retransmission feedback. The benefits of the techniques for predictive retransmission feedback may include improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of machine learning assisted predictive retransmission feedback as described herein, or the processor 1040 and the memory 1030 may be otherwise configured to perform or support such operations.

Figure 11:
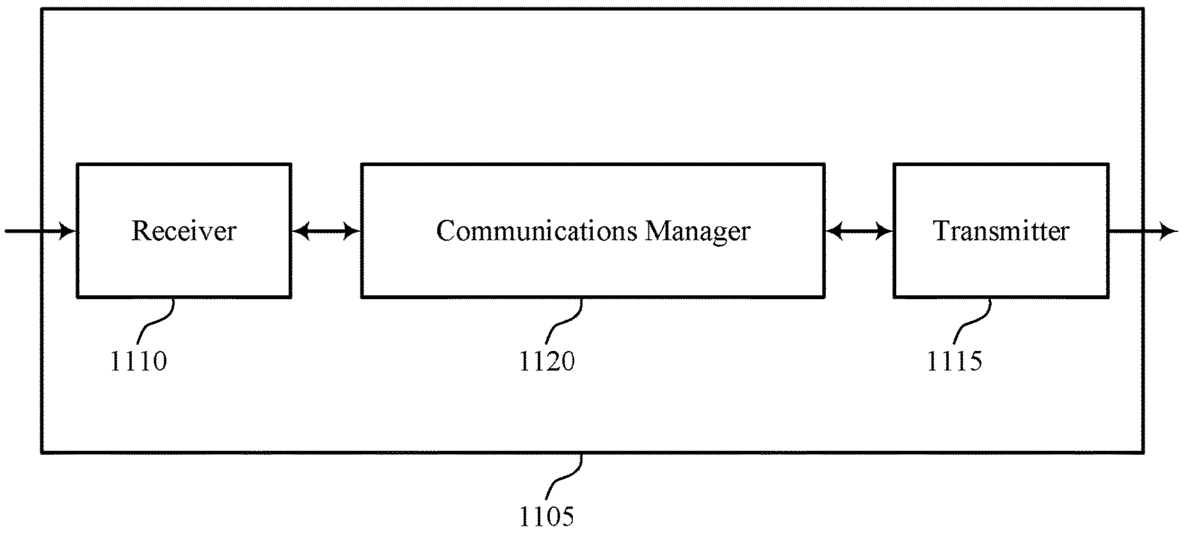
FIGS. 11 and 12 show block diagrams of devices that support machine learning assisted predictive retransmission feedback in accordance with aspects of the present disclosure.

FIG. 11 shows a block diagram 1100 of a device 1105 that supports machine learning assisted predictive retransmission feedback in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to machine learning assisted predictive retransmission feedback). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to machine learning assisted predictive retransmission feedback). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of machine learning assisted predictive retransmission feedback as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for receiving, from a UE, a capability parameter indicating one or more predictive retransmission feedback capabilities of the UE. The communications manager 1120 may be configured as or otherwise support a means for configuring an activation indicator in accordance with the received capability parameter. The communications manager 1120 may be configured as or otherwise support a means for transmitting, to the UE, the activation indicator indicating that a predictive retransmission feedback procedure is enabled. The communications manager 1120 may be configured as or otherwise support a means for transmitting data to the UE. The communications manager 1120 may be configured as or otherwise support a means for receiving a predictive retransmission feedback associated with the data from the UE prior to a decoding of the data being completed.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for predictive retransmission feedback. The benefits of the techniques for predictive retransmission feedback may include a decrease in the latency associated with HARQ feedback procedures, reducing processing, reducing power consumption, and increasing efficient utilization of communication resources.

Figure 12:
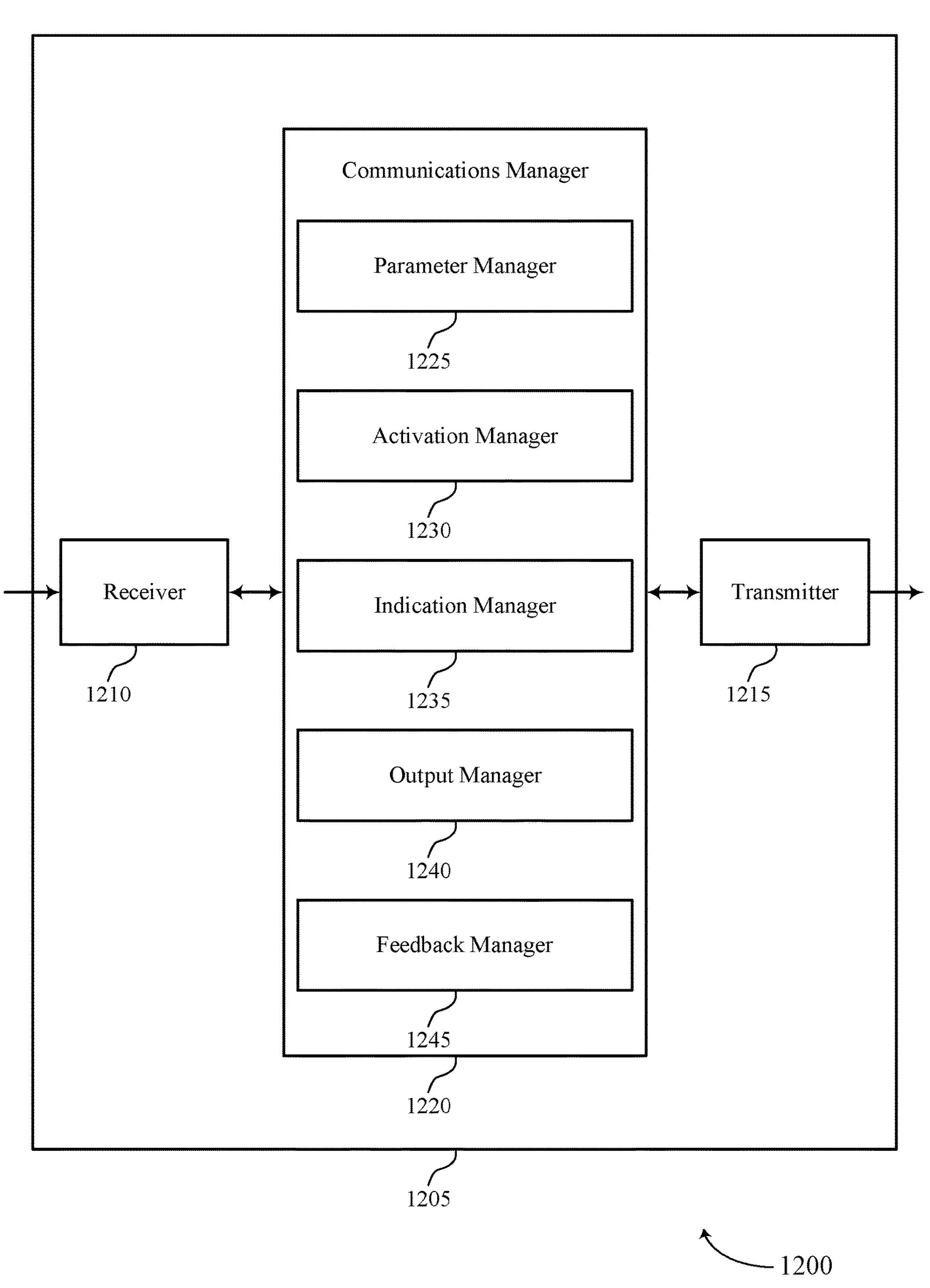

FIG. 12 shows a block diagram 1200 of a device 1205 that supports machine learning assisted predictive retransmission feedback in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to machine learning assisted predictive retransmission feedback). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to machine learning assisted predictive retransmission feedback). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of machine learning assisted predictive retransmission feedback as described herein. For example, the communications manager 1220 may include a parameter manager 1225, an activation manager 1230, an indication manager 1235, an output manager 1240, a feedback manager 1245, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The parameter manager 1225 may be configured as or otherwise support a means for receiving, from a UE, a capability parameter indicating one or more predictive retransmission feedback capabilities of the UE. The activation manager 1230 may be configured as or otherwise support a means for configuring an activation indicator in accordance with the received capability parameter. The indication manager 1235 may be configured as or otherwise support a means for transmitting, to the UE, the activation indicator indicating that a predictive retransmission feedback procedure is enabled. The output manager 1240 may be configured as or otherwise support a means for transmitting data to the UE. The feedback manager 1245 may be configured as or otherwise support a means for receiving a predictive retransmission feedback associated with the data from the UE prior to a decoding of the data being completed.

Figure 13:
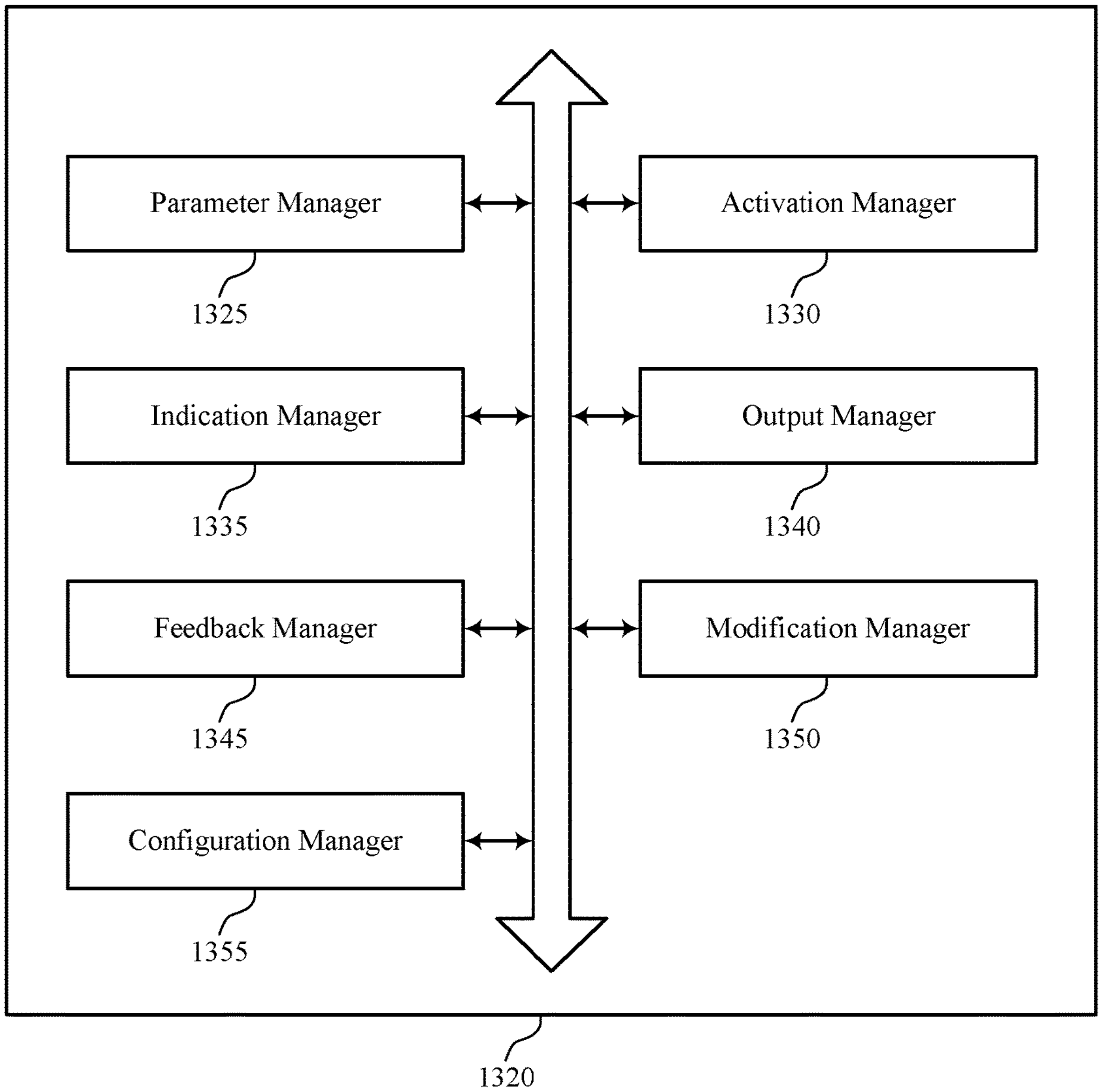
FIG. 13 shows a block diagram of a communications manager that supports machine learning assisted predictive retransmission feedback in accordance with aspects of the present disclosure.

FIG. 13 shows a block diagram 1300 of a communications manager 1320 that supports machine learning assisted predictive retransmission feedback in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of machine learning assisted predictive retransmission feedback as described herein. For example, the communications manager 1320 may include a parameter manager 1325, an activation manager 1330, an indication manager 1335, an output manager 1340, a feedback manager 1345, a modification manager 1350, a configuration manager 1355, or any combination thereof. Each of these components may communicate, directly or indirectly, with one another (e.g., via one or more buses).

The communications manager 1320 may support wireless communication at a base station in accordance with examples as disclosed herein. The parameter manager 1325 may be configured as or otherwise support a means for receiving, from a UE, a capability parameter indicating one or more predictive retransmission feedback capabilities of the UE. The activation manager 1330 may be configured as or otherwise support a means for configuring an activation indicator in accordance with the received capability parameter. The indication manager 1335 may be configured as or otherwise support a means for transmitting, to the UE, the activation indicator indicating that a predictive retransmission feedback procedure is enabled. The output manager 1340 may be configured as or otherwise support a means for transmitting data to the UE. The feedback manager 1345 may be configured as or otherwise support a means for receiving a predictive retransmission feedback associated with the data from the UE prior to a decoding of the data being completed.

In some examples, the parameter manager 1325 may be configured as or otherwise support a means for receiving the capability parameter from the UE via radio resource control signaling, or uplink control information, or MAC-CE, or any combination thereof.

In some examples, the indication manager 1335 may be configured as or otherwise support a means for transmitting the activation indicator to the UE via downlink control information, or MAC-CE, or radio resource control signaling, or any combination thereof.

In some examples, the feedback manager 1345 may be configured as or otherwise support a means for receiving, from the UE, a first predictive retransmission feedback on a first physical uplink resource indicated via the activation indicator. In some examples, the feedback manager 1345 may be configured as or otherwise support a means for receiving, from the UE, a second predictive retransmission feedback on a second physical uplink resource indicated via the activation indicator.

In some examples, the modification manager 1350 may be configured as or otherwise support a means for determining that the predictive retransmission feedback includes a non-acknowledgement feedback for the data. In some examples, the modification manager 1350 may be configured as or otherwise support a means for receiving, from the UE, a modification indicator configured with a first index value selected from a set of modification index values, the first index value indicating a request to increase an aspect of a physical uplink resource indicated via the activation indicator in accordance with the determined non-acknowledgement feedback.

In some examples, the modification manager 1350 may be configured as or otherwise support a means for determining that the predictive retransmission feedback includes an acknowledgement feedback for the data. In some examples, the modification manager 1350 may be configured as or otherwise support a means for receiving, from the UE, a modification indicator configured with a first index value selected from a set of modification index values, the first index value indicating a request to decrease an aspect of a physical uplink resource indicated via the activation indicator in accordance with the determined acknowledgement feedback.

In some examples, the parameter manager 1325 may be configured as or otherwise support a means for receiving, from the UE, at least one index of a capability table, each index of the capability table including one or more configured (e.g., preconfigured) capability parameters.

In some examples, the parameter manager 1325 may be configured as or otherwise support a means for determining that the capability parameter includes a maximum supported transport block size, or a maximum supported code rate, or a minimum time window in which to transmit one or more predictive retransmission feedbacks per data transmission, a false alarm probability constraint, or a missed detection probability constraint, or support for the predictive retransmission feedback procedure, or support for multiple predictive retransmission feedbacks per data transmission, or any combination thereof.

In some examples, the configuration manager 1355 may be configured as or otherwise support a means for configuring the activation indicator to indicate a physical uplink resource for a single predictive retransmission feedback per data transmission or physical uplink resources for multiple predictive retransmission feedbacks per data transmission.

In some examples, the configuration manager 1355 may be configured as or otherwise support a means for configuring the activation indicator to indicate a slot offset for each physical uplink resource scheduled for the predictive retransmission feedback procedure.

In some examples, the configuration manager 1355 may be configured as or otherwise support a means for determining a configuration of the predictive retransmission feedback procedure in accordance with the capability parameter. In some examples, the configuration manager 1355 may be configured as or otherwise support a means for configuring the activation indicator to indicate the configuration of the predictive retransmission feedback procedure or a periodic physical uplink resource pre-configured for the predictive retransmission feedback procedure, or configuring the activation indicator to indicate both.

Figure 14:
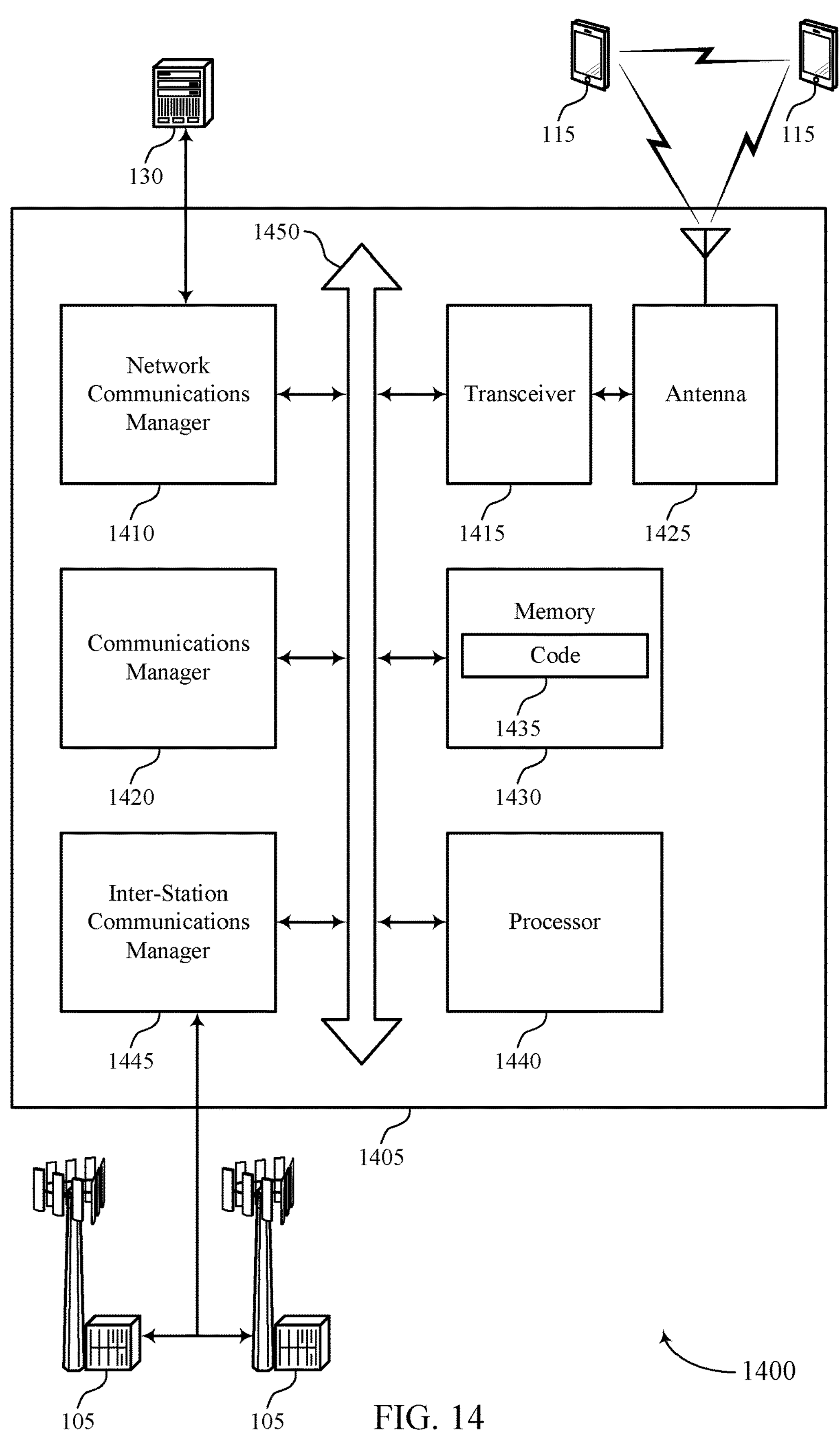
FIG. 14 shows a diagram of a system including a device that supports machine learning assisted predictive retransmission feedback in accordance with aspects of the present disclosure.

FIG. 14 shows a diagram of a system 1400 including a device 1405 that supports machine learning assisted predictive retransmission feedback in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting machine learning assisted predictive retransmission feedback). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for receiving, from a UE, a capability parameter indicating one or more predictive retransmission feedback capabilities of the UE. The communications manager 1420 may be configured as or otherwise support a means for configuring an activation indicator in accordance with the received capability parameter. The communications manager 1420 may be configured as or otherwise support a means for transmitting, to the UE, the activation indicator indicating that a predictive retransmission feedback procedure is enabled. The communications manager 1420 may be configured as or otherwise support a means for transmitting data to the UE. The communications manager 1420 may be configured as or otherwise support a means for receiving a predictive retransmission feedback associated with the data from the UE prior to a decoding of the data being completed.

By including or configuring the communications manager 1420 in accordance with examples as described herein, the device 1405 may support techniques for predictive retransmission feedback. The benefits of the techniques for predictive retransmission feedback may include improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of machine learning assisted predictive retransmission feedback as described herein, or the processor 1440 and the memory 1430 may be otherwise configured to perform or support such operations.

Figure 15:
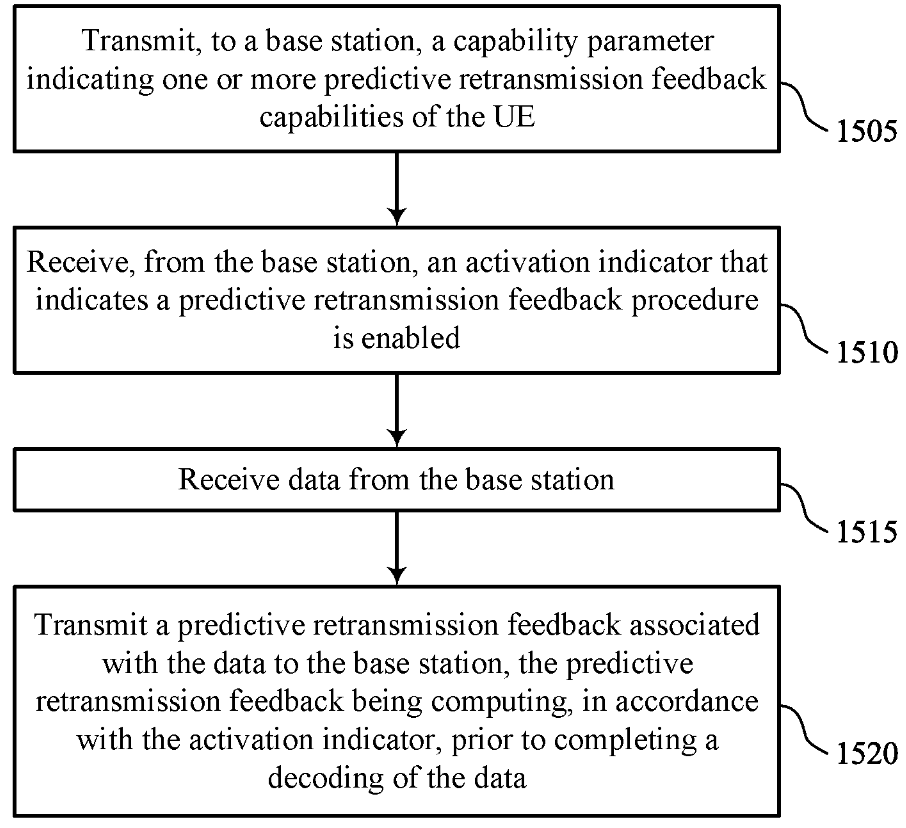
FIGS. 15 through 18 show flowcharts illustrating methods that support machine learning assisted predictive retransmission feedback in accordance with aspects of the present disclosure.

FIG. 15 shows a flowchart illustrating a method 1500 that supports machine learning assisted predictive retransmission feedback in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, a capability parameter indicating one or more predictive retransmission feedback capabilities of the UE. The operations of 1505 may be performed in accordance with examples as disclosed herein. In some examples, aspects of the operations of 1505 may be performed by a capability manager 925 as described with reference to FIG. 9.

At 1510, the method may include receiving, from the base station, an activation indicator that indicates a predictive retransmission feedback procedure is enabled. The operations of 1510 may be performed in accordance with examples as disclosed herein. In some examples, aspects of the operations of 1510 may be performed by a process manager 930 as described with reference to FIG. 9.

At 1515, the method may include receiving data from the base station. The operations of 1515 may be performed in accordance with examples as disclosed herein. In some examples, aspects of the operations of 1515 may be performed by a data manager 935 as described with reference to FIG. 9.

At 1520, the method may include transmitting a predictive retransmission feedback associated with the data to the base station, the predictive retransmission feedback being computed, in accordance with the activation indicator, prior to completing a decoding of the data. The operations of 1520 may be performed in accordance with examples as disclosed herein. In some examples, aspects of the operations of 1520 may be performed by a prediction manager 940 as described with reference to FIG. 9.

Figure 16:
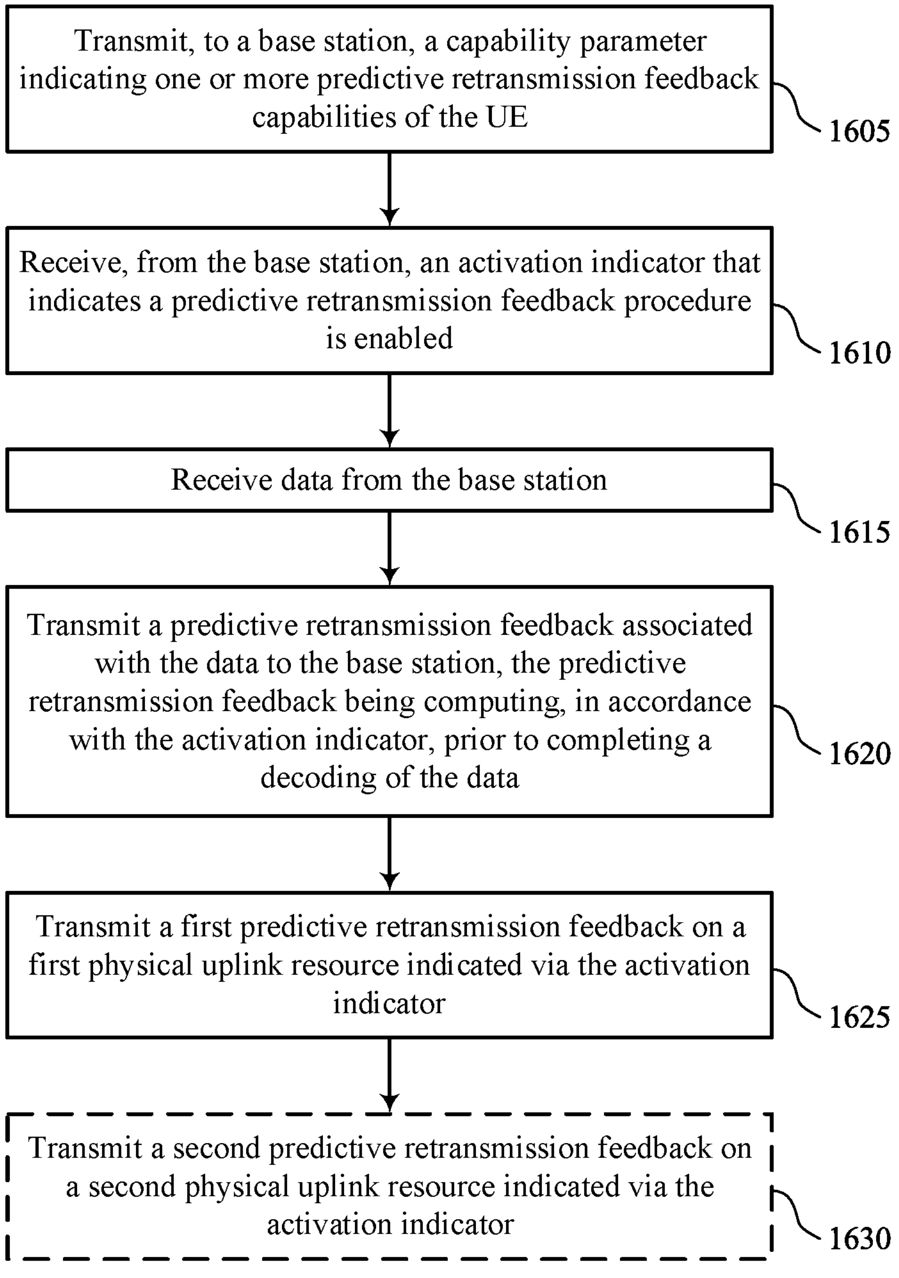

FIG. 16 shows a flowchart illustrating a method 1600 that supports machine learning assisted predictive retransmission feedback in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include transmitting, to a base station, a capability parameter indicating one or more predictive retransmission feedback capabilities of the UE. The operations of 1605 may be performed in accordance with examples as disclosed herein. In some examples, aspects of the operations of 1605 may be performed by a capability manager 925 as described with reference to FIG. 9.

At 1610, the method may include receiving, from the base station, an activation indicator that indicates a predictive retransmission feedback procedure is enabled. The operations of 1610 may be performed in accordance with examples as disclosed herein. In some examples, aspects of the operations of 1610 may be performed by a process manager 930 as described with reference to FIG. 9.

At 1615, the method may include receiving data from the base station. The operations of 1615 may be performed in accordance with examples as disclosed herein. In some examples, aspects of the operations of 1615 may be performed by a data manager 935 as described with reference to FIG. 9.

At 1620, the method may include transmitting a predictive retransmission feedback associated with the data to the base station, the predictive retransmission feedback being computed, in accordance with the activation indicator, prior to completing a decoding of the data. The operations of 1620 may be performed in accordance with examples as disclosed herein. In some examples, aspects of the operations of 1620 may be performed by a prediction manager 940 as described with reference to FIG. 9.

At 1625, the method may include transmitting a first predictive retransmission feedback on a first physical uplink resource indicated via the activation indicator. The operations of 1625 may be performed in accordance with examples as disclosed herein. In some examples, aspects of the operations of 1625 may be performed by a prediction manager 940 as described with reference to FIG. 9.

At 1630, the method may optionally include transmitting a second predictive retransmission feedback on a second physical uplink resource indicated via the activation indicator. The operations of 1630 may be performed in accordance with examples as disclosed herein. In some examples, aspects of the operations of 1630 may be performed by a prediction manager 940 as described with reference to FIG. 9.

Figure 17:
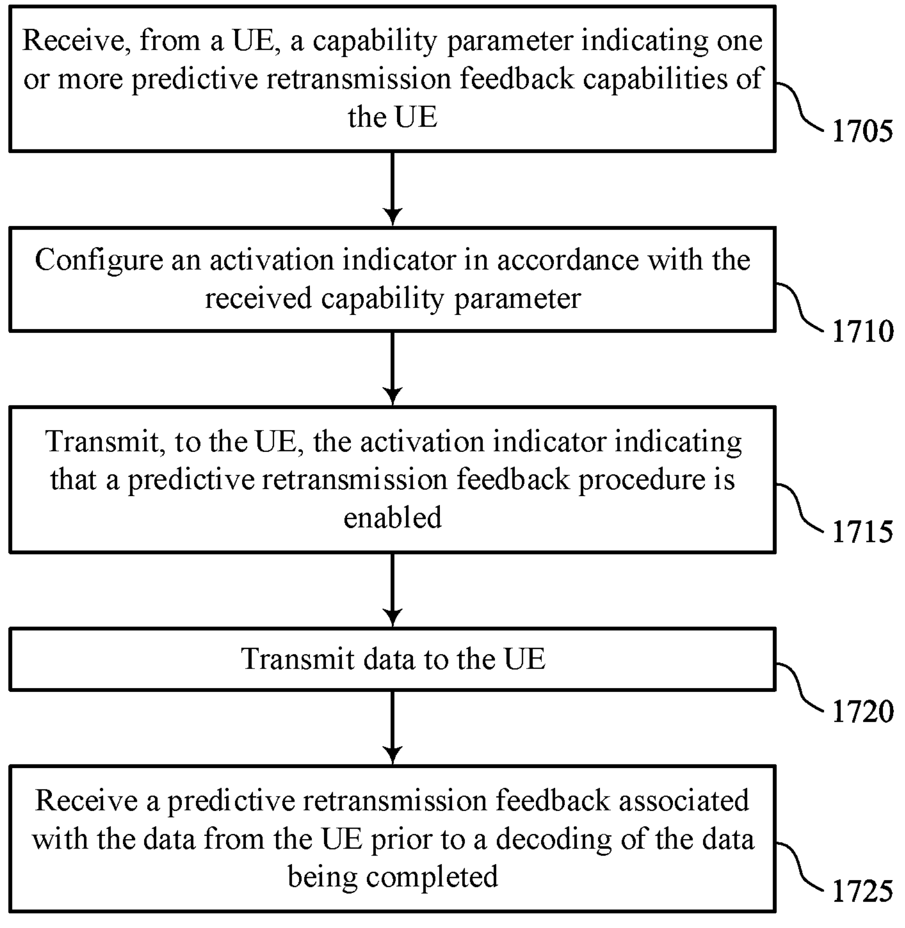

FIG. 17 shows a flowchart illustrating a method 1700 that supports machine learning assisted predictive retransmission feedback in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a capability parameter indicating one or more predictive retransmission feedback capabilities of the UE. The operations of 1705 may be performed in accordance with examples as disclosed herein. In some examples, aspects of the operations of 1705 may be performed by a parameter manager 1325 as described with reference to FIG. 13.

At 1710, the method may include configuring an activation indicator in accordance with the received capability parameter. The operations of 1710 may be performed in accordance with examples as disclosed herein. In some examples, aspects of the operations of 1710 may be performed by an activation manager 1330 as described with reference to FIG. 13.

At 1715, the method may include transmitting, to the UE, the activation indicator indicating that a predictive retransmission feedback procedure is enabled. The operations of 1715 may be performed in accordance with examples as disclosed herein. In some examples, aspects of the operations of 1715 may be performed by an indication manager 1335 as described with reference to FIG. 13.

At 1720, the method may include transmitting data to the UE. The operations of 1720 may be performed in accordance with examples as disclosed herein. In some examples, aspects of the operations of 1720 may be performed by an output manager 1340 as described with reference to FIG. 13.

At 1725, the method may include receiving a predictive retransmission feedback associated with the data from the UE prior to a decoding of the data being completed. The operations of 1725 may be performed in accordance with examples as disclosed herein. In some examples, aspects of the operations of 1725 may be performed by a feedback manager 1345 as described with reference to FIG. 13.

Figure 18:
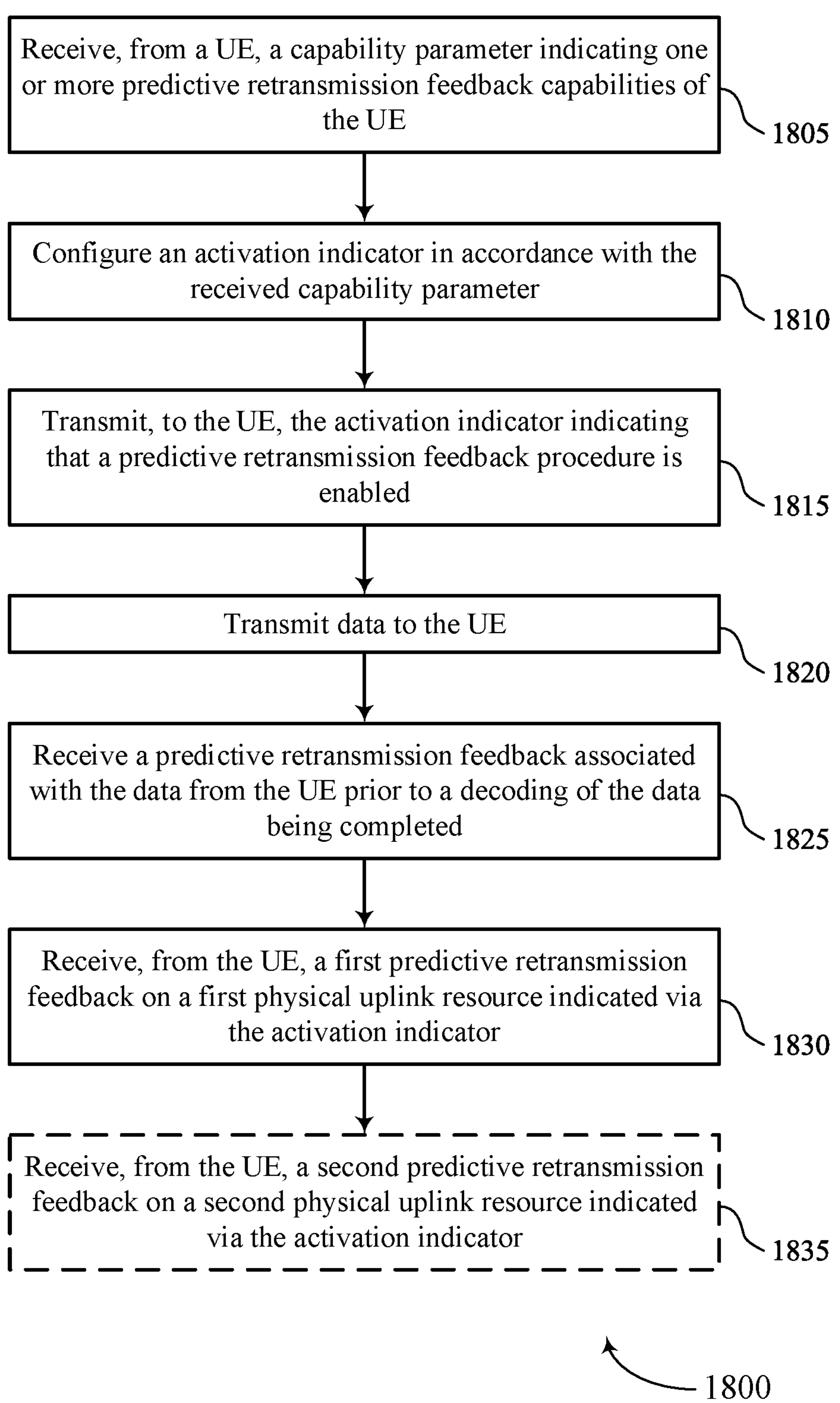

FIG. 18 shows a flowchart illustrating a method 1800 that supports machine learning assisted predictive retransmission feedback in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, a capability parameter indicating one or more predictive retransmission feedback capabilities of the UE. The operations of 1805 may be performed in accordance with examples as disclosed herein. In some examples, aspects of the operations of 1805 may be performed by a parameter manager 1325 as described with reference to FIG. 13.

At 1810, the method may include configuring an activation indicator in accordance with the received capability parameter. The operations of 1810 may be performed in accordance with examples as disclosed herein. In some examples, aspects of the operations of 1810 may be performed by an activation manager 1330 as described with reference to FIG. 13.

At 1815, the method may include transmitting, to the UE, the activation indicator indicating that a predictive retransmission feedback procedure is enabled. The operations of 1815 may be performed in accordance with examples as disclosed herein. In some examples, aspects of the operations of 1815 may be performed by an indication manager 1335 as described with reference to FIG. 13.

At 1820, the method may include transmitting data to the UE. The operations of 1820 may be performed in accordance with examples as disclosed herein. In some examples, aspects of the operations of 1820 may be performed by an output manager 1340 as described with reference to FIG. 13.

At 1825, the method may include receiving a predictive retransmission feedback associated with the data from the UE prior to a decoding of the data being completed. The operations of 1825 may be performed in accordance with examples as disclosed herein. In some examples, aspects of the operations of 1825 may be performed by a feedback manager 1345 as described with reference to FIG. 13.

At 1830, the method may include receiving, from the UE, a first predictive retransmission feedback on a first physical uplink resource indicated via the activation indicator. The operations of 1830 may be performed in accordance with examples as disclosed herein. In some examples, aspects of the operations of 1830 may be performed by a feedback manager 1345 as described with reference to FIG. 13.

At 1835, the method may optionally include receiving, from the UE, a second predictive retransmission feedback on a second physical uplink resource indicated via the activation indicator. The operations of 1835 may be performed in accordance with examples as disclosed herein. In some examples, aspects of the operations of 1835 may be performed by a feedback manager 1345 as described with reference to FIG. 13.

The following provides an overview of aspects of the present disclosure:

Aspect 1: A method for wireless communication at a UE, comprising: transmitting, to a base station, a capability parameter indicating one or more predictive retransmission feedback capabilities of the UE; receiving, from the base station, an activation indicator that indicates a predictive retransmission feedback procedure is enabled; receiving data from the base station; and transmitting a predictive retransmission feedback associated with the data to the base station, the predictive retransmission feedback being computed, in accordance with the activation indicator, prior to completing a decoding of the data.

Aspect 2: The method of aspect 1, further comprising: transmitting the capability parameter to the base station via radio resource control signaling, or uplink control information, or media access control control element (MAC-CE), or any combination thereof.

Aspect 3: The method of any of aspects 1 through 2, further comprising: receiving the activation indicator from the base station via downlink control information, or media access control control element (MAC-CE), or radio resource control signaling, or any combination thereof.

Aspect 4: The method of any of aspects 1 through 3, transmitting the predictive retransmission feedback of the data transmission comprising: transmitting a first predictive retransmission feedback on a first physical uplink resource indicated via the activation indicator; and transmitting a second predictive retransmission feedback on a second physical uplink resource indicated via the activation indicator.

Aspect 5: The method of any of aspects 1 through 4, computing the predictive retransmission feedback associated with the data comprising: transmitting, to the base station, a request to increase or decrease an aspect of a physical downlink resource indicated via the activation indicator in response to computing the predictive retransmission feedback.

Aspect 6: The method of any of aspects 1 through 5, wherein the request comprises a modification indicator selected from a set of modification index values, and wherein when the predictive retransmission feedback indicates a non-acknowledgement feedback the modification indicator is configured with a first index value to indicate a degree of increase with respect to the aspect of the physical downlink resource, and when the predictive retransmission feedback includes an acknowledgement feedback the modification indicator is configured with a second index value to indicate a degree of decrease with respect to the aspect of the physical downlink resource.

Aspect 7: The method of any of aspects 1 through 6, transmitting the capability parameter comprising: selecting at least one index of a capability table, each index of the capability table comprising one or more configured capability parameters; and transmitting the selected at least one index to the base station.

Aspect 8: The method of any of aspects 1 through 7, the capability parameter comprising a maximum supported transport block size, or a maximum supported code rate, or a minimum time window in which to transmit one or more predictive retransmission feedbacks per data transmission, a false alarm probability constraint, or a missed detection probability constraint, or support for the predictive retransmission feedback procedure, or support for multiple predictive retransmission feedbacks per data transmission, or any combination thereof.

Aspect 9: The method of any of aspects 1 through 8, further comprising: determining that the activation indicator indicates a physical uplink resource for a single predictive retransmission feedback per data transmission or indicates physical uplink resources for multiple predictive retransmission feedbacks per data transmission.

Aspect 10: The method of any of aspects 1 through 9, further comprising: determining that the activation indicator indicates a slot offset for each physical uplink resource scheduled for the predictive retransmission feedback procedure associated with the data.

Aspect 11: The method of any of aspects 1 through 10, further comprising: determining that the activation indicator indicates a configuration of the predictive retransmission feedback procedure or a periodic physical uplink resource pre-configured for the predictive retransmission feedback procedure, or determining that the activation indicator indicates both.

Aspect 12: A method for wireless communication at a base station, comprising: receiving, from a UE, a capability parameter indicating one or more predictive retransmission feedback capabilities of the UE; configuring an activation indicator in accordance with the received capability parameter; transmitting, to the UE, the activation indicator indicating that a predictive retransmission feedback procedure is enabled; transmitting data to the UE; and receiving a predictive retransmission feedback associated with the data from the UE prior to a decoding of the data being completed.

Aspect 13: The method of aspect 12, further comprising: receiving the capability parameter from the UE via radio resource control signaling, or uplink control information, or media access control control element (MAC-CE), or any combination thereof.

Aspect 14: The method of any of aspects 12 through 13, further comprising: transmitting the activation indicator to the UE via downlink control information, or media access control control element (MAC-CE), or radio resource control signaling, or any combination thereof.

Aspect 15: The method of any of aspects 12 through 14, receiving the predictive retransmission feedback associated with the data comprising: receiving, from the UE, a first predictive retransmission feedback on a first physical uplink resource indicated via the activation indicator; and receiving, from the UE, a second predictive retransmission feedback on a second physical uplink resource indicated via the activation indicator.

Aspect 16: The method of any of aspects 12 through 15, further comprising: determining that the predictive retransmission feedback comprises a non-acknowledgement feedback for the data; and receiving, from the UE, a modification indicator configured with a first index value selected from a set of modification index values, the first index value indicating a request to increase an aspect of a physical uplink resource indicated via the activation indicator in accordance with the determined non-acknowledgement feedback.

Aspect 17: The method of any of aspects 12 through 16, further comprising: determining that the predictive retransmission feedback comprises an acknowledgement feedback for the data; and receiving, from the UE, a modification indicator configured with a first index value selected from a set of modification index values, the first index value indicating a request to decrease an aspect of a physical uplink resource indicated via the activation indicator in accordance with the determined acknowledgement feedback.

Aspect 18: The method of any of aspects 12 through 17, receiving the capability parameter comprising: receiving, from the UE, at least one index of a capability table, each index of the capability table comprising one or more configured capability parameters.

Aspect 19: The method of any of aspects 12 through 18, further comprising: determining that the capability parameter comprises a maximum supported transport block size, or a maximum supported code rate, or a minimum time window in which to transmit one or more predictive retransmission feedbacks per data transmission, a false alarm probability constraint, or a missed detection probability constraint, or support for the predictive retransmission feedback procedure, or support for multiple predictive retransmission feedbacks per data transmission, or any combination thereof.

Aspect 20: The method of any of aspects 12 through 19, further comprising: configuring the activation indicator to indicate a physical uplink resource for a single predictive retransmission feedback per data transmission or physical uplink resources for multiple predictive retransmission feedbacks per data transmission.

Aspect 21: The method of any of aspects 12 through 20, further comprising: configuring the activation indicator to indicate a slot offset for each physical uplink resource scheduled for the predictive retransmission feedback procedure.

Aspect 22: The method of any of aspects 12 through 21, further comprising: determining a configuration of the predictive retransmission feedback procedure in accordance with the capability parameter; and configuring the activation indicator to indicate the configuration of the predictive retransmission feedback procedure or a periodic physical uplink resource pre-configured for the predictive retransmission feedback procedure, or configuring the activation indicator to indicate both.

Aspect 23: An apparatus for wireless communication at a UE, comprising a processor and memory coupled to the processor, the processor and memory configured to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising a processor and memory coupled to the processor, the processor and memory configured to perform a method of any of aspects 1 through 11.

Aspect 26: An apparatus for wireless communication at a base station, comprising a processor and memory coupled to the processor, the processor and memory configured to perform a method of any of aspects 12 through 22.

Aspect 27: An apparatus for wireless communication at a base station, comprising at least one means for performing a method of any of aspects 12 through 22.

Aspect 28: A non-transitory computer-readable medium storing code for wireless communication at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

transmitting, to a network entity, a capability parameter indicating one or more predictive retransmission feedback capabilities of the UE;

receiving, from the network entity, an activation indicator that indicates a predictive retransmission feedback procedure is enabled;

receiving data from the network entity; and transmitting a predictive retransmission feedback associated with the data to the network entity, the predictive retransmission feedback being computed, in accordance with the activation indicator, prior to completing a decoding of the data, wherein the transmitting the predictive retransmission feedback associated with the data comprises:

transmitting, to the network entity, a request to increase or decrease an aspect of a physical downlink resource indicated via the activation indicator in response to computing the predictive retransmission feedback.

2. The method of claim 1, further comprising:

transmitting the capability parameter to the network entity via radio resource control signaling, or uplink control information, or media access control control element (MAC-CE), or any combination thereof.

3. The method of claim 1, further comprising:

receiving the activation indicator from the network entity via downlink control information, or media access control control element (MAC-CE), or radio resource control signaling, or any combination thereof.

4. The method of claim 1, transmitting the predictive retransmission feedback associated with the data comprising:

transmitting a first predictive retransmission feedback on a first physical uplink resource indicated via the activation indicator; and transmitting a second predictive retransmission feedback on a second physical uplink resource indicated via the activation indicator.

5. The method of claim 1, wherein the request comprises a modification indicator selected from a set of modification index values, and wherein when the predictive retransmission feedback indicates a non-acknowledgement feedback, the modification indicator is configured with a first index value to indicate a degree of increase with respect to the aspect of the physical downlink resource, and when the predictive retransmission feedback includes an acknowledgement feedback, the modification indicator is configured with a second index value to indicate a degree of decrease with respect to the aspect of the physical downlink resource.

6. The method of claim 1, transmitting the capability parameter comprising:

selecting at least one index of a capability table, each index of the capability table comprising one or more configured capability parameters; and transmitting the selected at least one index to the network entity.

7. The method of claim 1, wherein the capability parameter comprises a maximum supported transport block size, or a maximum supported code rate, or a minimum time window in which to transmit one or more predictive retransmission feedbacks per data transmission, or a false alarm probability constraint, or a missed detection probability constraint, or support for the predictive retransmission feedback procedure, or support for multiple predictive retransmission feedbacks per data transmission, or any combination thereof.

8. The method of claim 1, further comprising:

determining that the activation indicator indicates a physical uplink resource for a single predictive retransmission feedback per data transmission or indicates physical uplink resources for multiple predictive retransmission feedbacks per data transmission.

9. The method of claim 1, further comprising:

determining that the activation indicator indicates a slot offset for each physical uplink resource scheduled for the predictive retransmission feedback procedure associated with the data.

10. The method of claim 1, further comprising:

determining that the activation indicator indicates a configuration of the predictive retransmission feedback procedure or a periodic physical uplink resource preconfigured for the predictive retransmission feedback procedure, or determining that the activation indicator indicates both.

11. A method for wireless communication at a network entity, comprising:

obtaining a capability parameter indicating one or more predictive retransmission feedback capabilities of a user equipment (UE);

configuring an activation indicator in accordance with the obtained capability parameter;

providing the activation indicator indicating that a predictive retransmission feedback procedure is enabled;

providing data; and obtaining a predictive retransmission feedback associated with the data prior to a decoding of the data being completed, wherein obtaining the predictive retransmission feedback associated with the data comprises:

obtaining a request to increase or decrease an aspect of a physical downlink resource indicated via the activation indicator.

12. The method of claim 11, further comprising:

obtaining the capability parameter via radio resource control signaling, or uplink control information, or media access control control element (MAC-CE), or any combination thereof.

13. The method of claim 11, further comprising:

providing the activation indicator via downlink control information, or media access control control element (MAC-CE), or radio resource control signaling, or any combination thereof.

14. The method of claim 11, obtaining the predictive retransmission feedback associated with the data comprising:

obtaining a first predictive retransmission feedback on a first physical uplink resource indicated via the activation indicator; and obtaining a second predictive retransmission feedback on a second physical uplink resource indicated via the activation indicator.

15. The method of claim 11, further comprising:

determining that the predictive retransmission feedback comprises a non-acknowledgement feedback for the data; and obtaining a modification indicator configured with a first index value selected from a set of modification index values, the first index value indicating a request to increase an aspect of a physical uplink resource indicated via the activation indicator in accordance with the non-acknowledgement feedback.

16. The method of claim 11, further comprising:

determining that the predictive retransmission feedback comprises an acknowledgement feedback for the data; and obtaining a modification indicator configured with a first index value selected from a set of modification index values, the first index value indicating a request to decrease an aspect of a physical uplink resource indicated via the activation indicator in accordance with the acknowledgement feedback.

17. The method of claim 11, obtaining the capability parameter comprising:

obtaining at least one index of a capability table, each index of the capability table comprising one or more configured capability parameters.

18. The method of claim 11, further comprising:

determining that the capability parameter comprises a maximum supported transport block size, or a maximum supported code rate, or a minimum time window in which to transmit one or more predictive retransmission feedbacks per data transmission, or a false alarm probability constraint, or a missed detection probability constraint, or support for the predictive retransmission feedback procedure, or support for multiple predictive retransmission feedbacks per data transmission, or any combination thereof.

19. The method of claim 11, further comprising:

configuring the activation indicator to indicate a physical uplink resource for a single predictive retransmission feedback per data transmission or physical uplink resources for multiple predictive retransmission feedbacks per data transmission.

20. The method of claim 11, further comprising:

configuring the activation indicator to indicate a slot offset for each physical uplink resource scheduled for the predictive retransmission feedback procedure.

21. The method of claim 11, further comprising:

determining a configuration of the predictive retransmission feedback procedure in accordance with the capability parameter; and configuring the activation indicator to indicate the configuration of the predictive retransmission feedback procedure or a periodic physical uplink resource preconfigured for the predictive retransmission feedback procedure, or configuring the activation indicator to indicate both.

22. An apparatus for wireless communication at a user equipment (UE), comprising:

one or more memories; and one or more processors coupled with the one or more memories and configured to cause the UE to:

transmit, to a network entity, a capability parameter that indicates one or more predictive retransmission feedback capabilities of the UE;

receive, from the network entity, an activation indicator that indicates a predictive retransmission feedback procedure is enabled;

receive data from the network entity; and transmit a predictive retransmission feedback associated with the data to the network entity, wherein the predictive retransmission feedback is configured to be computed, in accordance with the activation indicator, prior to completing a decoding of the data, and wherein to transmit the predictive retransmission feedback associated with the data, the one or more processors are configured to cause the UE to:

transmit, to the network entity, a request to increase or decrease an aspect of a physical downlink resource indicated via the activation indicator in response to computation of the predictive retransmission feedback.

23. The apparatus of claim 22, wherein the one or more processors are further configured to cause the UE to:

transmit the capability parameter to the network entity via radio resource control signaling, or uplink control information, or media access control control element (MAC-CE), or any combination thereof.

24. The apparatus of claim 22, wherein the one or more processors are further configured to cause the UE to:

receive the activation indicator from the network entity via downlink control information, or media access control control element (MAC-CE), or radio resource control signaling, or any combination thereof.

25. The apparatus of claim 22, wherein the one or more processors are further configured to cause the UE to:

transmit a first predictive retransmission feedback on a first physical uplink resource indicated via the activation indicator; and transmit a second predictive retransmission feedback on a second physical uplink resource indicated via the activation indicator.

26. An apparatus for wireless communication at a network entity, comprising:

one or more memories; and one or more processors coupled with the one or more memories and configured to cause the network entity to:

obtain a capability parameter indicating one or more predictive retransmission feedback capabilities of a user equipment (UE);

configure an activation indicator in accordance with the obtained capability parameter;

provide the activation indicator indicating that a predictive retransmission feedback procedure is enabled;

provide data; and obtain a predictive retransmission feedback associated with the data prior to a decoding of the data being completed, wherein to obtain the predictive retransmission feedback associated with the data, the one or more processors are configured to cause the network entity to:

obtain a request to increase or decrease an aspect of a physical downlink resource indicated via the activation indicator.

27. The apparatus of claim 26, wherein the one or more processors are further configured to cause the network entity to:

obtain the capability parameter via radio resource control signaling, or uplink control information, or media access control control element (MAC-CE), or any combination thereof.

28. The apparatus of claim 26, wherein the one or more processors are further configured to cause the network entity to:

provide the activation indicator via downlink control information, or media access control control element (MAC-CE), or radio resource control signaling, or any combination thereof.

29. The apparatus of claim 26, wherein the one or more processors are further configured to cause the network entity to:

obtain a first predictive retransmission feedback on a first physical uplink resource indicated via the activation indicator; and obtain a second predictive retransmission feedback on a second physical uplink resource indicated via the activation indicator.

* * * * *